US008741376B2

(12) United States Patent
Broekaert et al.

(10) Patent No.: US 8,741,376 B2
(45) Date of Patent: Jun. 3, 2014

(54) NUTRIMENT CONTAINING ARABINOXYLAN AND OLIGOSACCHARIDES

(75) Inventors: Willem Broekaert, Dilbeek (BE); Christophe Courtin, Wilsele (BE); Bram Damen, Balen (BE); Jan Delcour, Heverlee (BE)

(73) Assignees: Cargill, Incorporated, Minneapolis, MN (US); Katholieke Universiteit Leuven, Leuven (BE)

( * ) Notice: Subject to any disclaimer, the term of this patent is extended or adjusted under 35 U.S.C. 154(b) by 19 days.

(21) Appl. No.: 13/139,050

(22) PCT Filed: Dec. 10, 2009

(86) PCT No.: PCT/BE2009/000062
§ 371 (c)(1),
(2), (4) Date: Jun. 10, 2011

(87) PCT Pub. No.: WO2010/066012
PCT Pub. Date: Jun. 17, 2010

(65) Prior Publication Data
US 2011/0244073 A1 Oct. 6, 2011

Related U.S. Application Data

(60) Provisional application No. 61/201,517, filed on Dec. 10, 2008.

(51) Int. Cl.
*A23G 3/00* (2006.01)
(52) U.S. Cl.
USPC .............................. 426/658; 426/50; 426/390
(58) Field of Classification Search
USPC ........................................................ 426/658
See application file for complete search history.

(56) References Cited

U.S. PATENT DOCUMENTS

2003/0091707 A1* 5/2003 Jindra et al. .................. 426/321

FOREIGN PATENT DOCUMENTS

| JP | 6217761 | 8/1994 |
| WO | 0033854 | 6/2000 |
| WO | 2008000050 | 1/2008 |
| WO | 2008087167 | 7/2008 |
| WO | 2008098320 | 8/2008 |

OTHER PUBLICATIONS

Swennen: Ultrafiltration and ethanol precipitation for isolation of arabinoxylooligosaccharides with different structures; Carbohydrate Polymers: vol. 62, Issue 3, Dec. 1, 2005, pp. 283-292.*
Arimoto: JP10312698; Production of Expanded Food; PUBN-Date: May 23, 2000.*
Hirose: JP2003310167; Method for Producing Cake; PUBN-Date: Nov. 5, 2003.*
Finnie: Influence of Cultivar and Environment on Water-Soluble and Water-Insoluble Arabinoxylans in Soft Wheat; Cereal Chem. 83(6):617-623; vol. 83, No. 6, 2006.*
EAS: EAS Consulting Group; Specializing in FDA Regulatory Matters; May 26, 2010.*

(Continued)

*Primary Examiner* — Patricia George
(74) *Attorney, Agent, or Firm* — Clark & Elbing LLP

(57) ABSTRACT

The present invention provides nutritional compositions, more particularly food supplements and processed food products, enriched with arabinoxylan-oligosaccharides and further comprising either or both water-unextractable arabinoxylans or water-soluble arabinoxylans. Preferably said nutritional compositions comprises both arabinoxylan-oligosaccharides and water-unextractable arabinoxylans.

15 Claims, 4 Drawing Sheets

(56) References Cited

OTHER PUBLICATIONS

Figure 1:
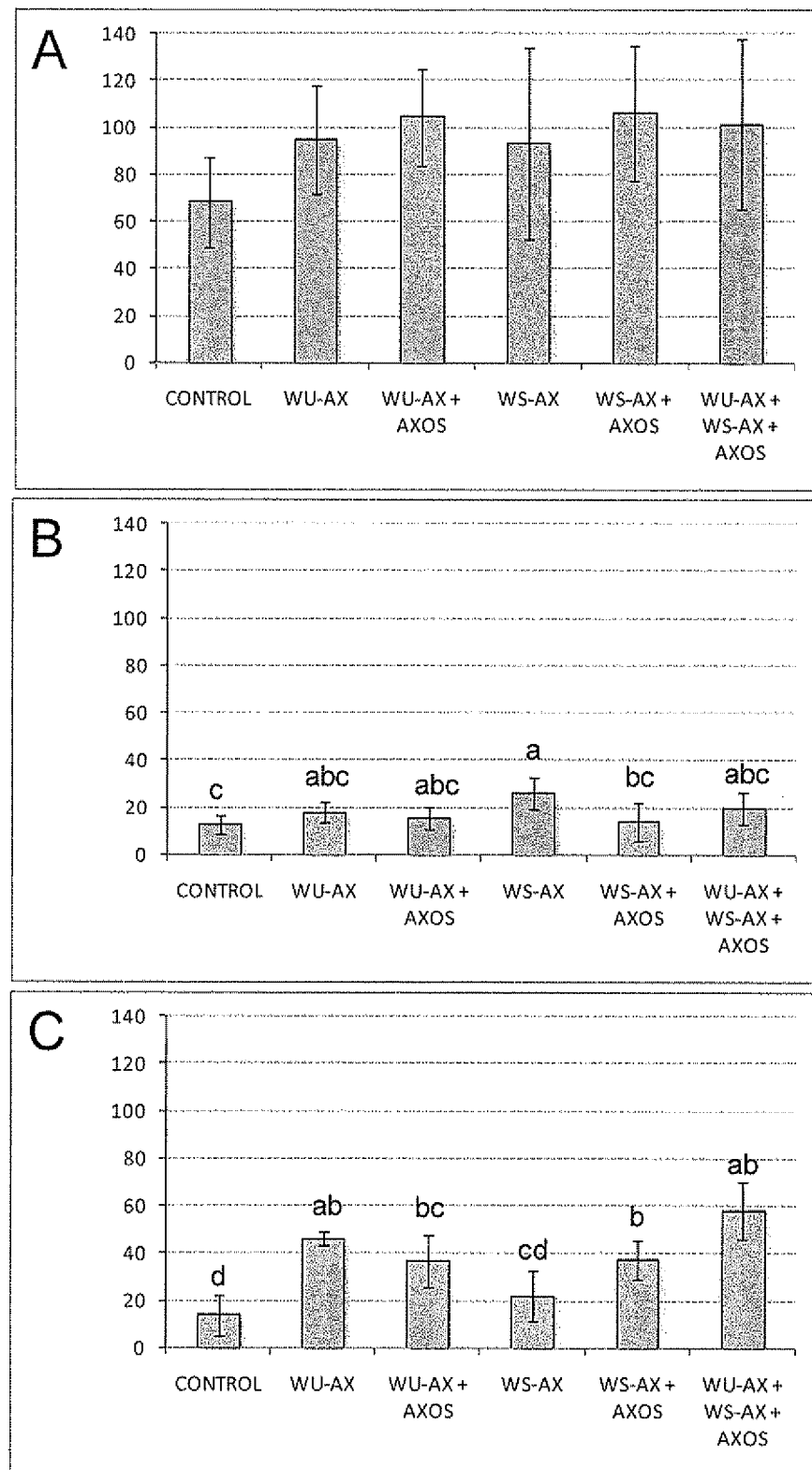

Rose: Autohydrolytic Production of Feruloylated Arabinoxylan Hydrolysates from Cereal Processing Coproducts for Food Applications, Chapter 6; Chapter DOI: 10.1021/bk-2011-1089.ch006; ACS Symposium Series, vol. 1089; ISBN13: 9780841226364eISBN: 9780841226418; Publication Date (Web): Nov. 30, 2011; Copyright © 2011 American Chemical Society.*

Sorensen: A novel GH43 α-I-arabinofuranosidase from Humicola insolens: mode of action and synergy with GH51 α-I-arabinofuranosidases on wheat arabinoxyla; Applied Microbiology and Biotechnology; Dec. 2006, vol. 73, Issue 4, pp. 850-861.*

Dornex: Impact of Wheat Flour-Associated Endoxylanases on Arabinoxylan in Dough after Mixing and Resting; J. Agric. Food Chem. 2007, 55, 7149-7155.*

Craeyveld et al.: Structurally Different Wheat-Derived Arabinoxylooligosaccharides Have Different Prebiotic and Fermentation Properties in Rats1,2; The Journal of Nutrition Nutrient Physiology, Metabolism, and Nutrient-Nutrient Interactions: Dec. 1; 138 (12) : 2293-2548.*

International Search Report with Written Opinion in PCT/BE2009/000062, Sep. 10, 2010.

* cited by examiner

NUTRIMENT CONTAINING ARABINOXYLAN AND OLIGOSACCHARIDES

FIELD OF THE INVENTION

The present invention relates to nutritional compositions, more particularly food supplements and processed food products, enriched with arabinoxylan-oligosaccharides and further comprising either or both water-unextractable arabinoxylans or water-soluble arabinoxylans. Preferably said nutritional compositions comprises both arabinoxylan-oligosaccharides and water-unextractable arabinoxylans.

BACKGROUND OF THE INVENTION

The invention relates to the positive effect on gastro-intestinal health of food, food ingredients or nutritional supplements with particular compositions of arabinoxylans. Arabinoxylan (AX), also referred to as pentosan, is a major constituent in the cell wall of many plant species. For instance in cereal grains, AX occurs at 5-10% of dry weight of the grains. In general, AX from cereals consists of a backbone of beta-(1-4)-linked D-xylopyranosyl residues (xylose), some of which are mono- or disubstituted with alpha-L-arabinofuranosyl residues (arabinose) (Izydorczyk and Biliaderis, 1995). The ratio of arabinose to xylose (A/X ratio or average degree of arabinose substitution) in cereal AX ranges from 0.10 to over 1.0, depending on tissue and plant species. In addition, more minor substituents can be attached to the xylose residues such as acetyl, alpha-glucuronyl, alpha-4-O-methylglucuronyl, galacturonyl, xylosyl, rhamnosyl, galactosyl, or glucosyl side chains, or short oligosaccharide side chains (Izydorczyk and Biliaderis, 1995; Andersson and Aman, 2001). Hydroxycinnamic acids, mainly ferulic acid, and to a lesser extent dehydrodiferulic acid, p-coumaric acid, or sinapic acid, are present as substituents as well, and they are generally linked to the C—(O)-5 position of terminal arabinose units (Izydorczyk and Biliaderis, 1995; Andersson and Aman, 2001). AX in cereals occurs in two forms, a water extractable form, also referred to as WE-AX, and a form that is water-unextractable (WU-AX) most likely due to covalent or non-covalent interactions with neighbouring AX molecules and other cell wall components such as proteins, cellulose or lignin (Andersson and Aman, 2001; Courtin and Delcour, 2002). In wheat grains, the AX present in aleurone and seed coat tissues are mainly water-unextractable AX (WU-AX) and have a low A/X ratio (about 0.1 to 0.4), while AX from the pericarp tissues are WU-AX with a high A/X ratio (about 1.0 to 1.3) (Andersson and Aman, 2001; Barron et al. 2007). The AX in the endospermic tissues of wheat are either WU-AX or WE-AX with an intermediate A/X ratio (about 0.5 to 0.7) (Izydorczyk and Biliaderis, 1995; Andersson and Aman, 2001).

Part of the WU-AX in cereal grains can be solubilised by low dose endoxylanase treatment. The enzyme-solubilized AX (ES-AX) and alkali-solubilised (AS-AX) have similar physicochemical properties as WE-AX (Courtin and Delcour, 2002). We will here refer to the group of WE-AX, AS-AX and ES-AX as water-soluble AX (WS-AX).

Prebiotics are compounds, usually oligosaccharides, that can not be digested by enzymes of the upper gastro-intestinal tract but are fermented selectively by some types of intestinal bacteria in the large intestine (Gibson and Roberfroid, 1995; Roberfroid, 1988; Van Loo, 2004). Ingestion of prebiotics causes a shift in the composition of the intestinal bacterial population, typically characterised by a relative increase in *Lactobacillus* and *Bifidobacterium* species. This shift in the intestinal microbiota is associated with improved overall health, reduced gut infections, better absorption of minerals, and suppression of colon cancer initiation (Van Loo, 2004; Macfarlane et al. 2006).

Fermentation of prebiotics by colonic bacteria gives rise to production of short chain fatty acids (SCFA) such as acetate, propionate, butyrate and lactate, which act as electron sinks of respiration in the anaerobic environment of the gut. The presence of SCFA in the intestines contributes to a lower pH, a better bio-availability of calcium and magnesium, and inhibition of potentially harmful bacteria (Teitelbaum and Walker, 2002; Wong et al. 2006). Among the SCFA, butyrate appears to be of greatest interest as butyrate is a preferred energy source for colonocytes (Roediger, 1982), stimulates colon epithelial cells, thereby increasing the absorptive capacity of the epithelium (Topping and Clifton, 2001), and inhibits the growth of colonic carcinoma cells, both in vitro and in vivo (Scheppach et al 1995). The cancer-suppressing properties of dietary fibres appear to correlate with their ability to generate butyrate upon colonic fermentation (Perrin et al. 2001).

The selective stimulation by prebiotics of certain colonic bacteria, such as *Lactobacilli* and *Bifidobacteria*, which typically use saccharolytic pathways to fuel their energy needs, is in some cases paralleled by suppression of protein fermentation in the colon (van Nuenen et al. 2003; De Preter et al. 2004; Geboes et al. 2005). Reduced protein fermentation in the colon is a desired outcome, as the amino acid degradation pathways in bacteria result in the production of potentially toxic catabolites such as ammonia, amines, phenols, indoles, and thiols, some of which have been implicated in bowel cancer (Bone at al 1976; Johnson, 1977; Visek 1978) and in exacerbation of diseases such as ulcerative colitis (Ramakrishna et al 1991).

Preparations of xylo-oligosaccharides (XOS, oligosaccharides consisting of β-1,4-linked D-xylopyranosyl units) with predominance of oligosaccharides with a degree of polymerisation (DP) of 2-3 (xylobiose and xylotriose), have been shown to cause a significant increase in the level of *Bifidobacteria* and SCFA in the faeces and caecum of rats (EP 0265970B1; Campbell at al., 1997; Hsu et al., 2004), and the colon of humans (Okazaki et al., 1990). Such xylobiose-rich XOS preparations also suppress early symptoms of chemical-induced colon carcinogenesis in rats (Hsu et al., 2004) and enhance the absorption of calcium in the colon (Toyoda at al., 1993). Experiments described in WO2006/002495 have provided evidence that arabinoxylan-derived oligosaccharides, also referred to as arabinoxylan-oligosaccharides or AXOS, with an intermediate average DP (avDP) ranging from 5 to 50 have better prebiotic properties than AXOS with higher avDP, and are less sweet than AXOS preparations with a lower avDP. Addition of such AXOS preparations to the diet causes a significant increase in the number of Bifidobacteria present in the caecum of chickens, caecum of rats, and faeces of humans (WO2006/002495).

Prebiotics, including AXOS, typically are water-soluble oligosaccharides, which can be readily incorporated into a wide range of food products without noticeably affecting their taste and texture. Therefore, prebiotics are generally considered as particularly suitable ingredients in the preparation of processed foods low in dietary fibre. Indeed, the addition of prebiotics allows to confer to such food certain of the health benefits associated with the presence of dietary fibre, without altering their appealing appearance, taste and texture. On the other hand, dietary fibre rich foods such as whole grain foods or bran enriched foods are typically not supplemented with prebiotic oligosaccharides.

In the context of the present invention it was shown that the water-unextractable arabinoxylan, such as contained in whole grain and bran-enriched foods, is a particularly suitable substrate for the formation of butyric acid in the large intestine. Moreover, it was surprisingly found that a combined consumption of water-unextractable arabinoxylan and arabinoxylan-oligosaccharides had a synergistic effect on the production of butyric acid in the large intestine. This finding indicates that regardless of their high dietary fibre content it is beneficial to supplement existing foods containing substantial amounts of water-unextractable arabinoxylans, such as whole grain or bran enriched foods with arabinoxylan-oligosaccharides. On the other hand, the synergistic effect of arabinoxylan-oligosaccharides and water-unextractable arabinoxylans on intestinal butyrate production allows to prepare foods containing water-unextractable arabinoxylans, which in combination with the arabinoxylan-oligosaccharides provide upon ingestion desirable levels of butyrate in the large intestine, while having a pleasant taste and texture. So in a first aspect the present invention relates to nutritional compositions, including food products, containing suitable levels of water-unextractable arabinoxylans and arabinoxylan-oligosaccharides, which upon ingestion provide a desirable intestinal production of butyrate. Further, it was observed that the consumption of a nutritional composition comprising both water-soluble arabinoxylans and arabinoxylan-oligosaccharides stimulated the production of butyrate, while strongly suppressing the protein fermentation in the large intestine. So in a second aspect the present invention relates to nutritional compositions comprising both water-soluble arabinoxylans and arabinoxylan-oligosaccharides, which upon ingestion provide for production of butyrate and inhibition of protein fermentation in the large intestine.

SUMMARY OF THE INVENTION

The present invention provides nutritional compositions, more particularly food supplements and processed food products, enriched with arabinoxylan-oligosaccharides and further comprising either or both water-unextractable arabinoxylans or water-soluble arabinoxylans. Preferably said nutritional compositions comprises both arabinoxylan-oligosaccharides and water-unextractable arabinoxylans.

DETAILED DESCRIPTION

List of Figures

FIG. 1: Effect of different types of arabinoxylans and their additive combinations on the concentration of acetate (A), propionate (B) and butyrate (C) in the colon of rats after 14 days of feeding. Concentrations are expressed in mmol per kg on fresh weight basis of colon content. Error bars indicate the standard deviation. Different letters above the bars indicate significant difference at $p<0.05$.

Figure 2:
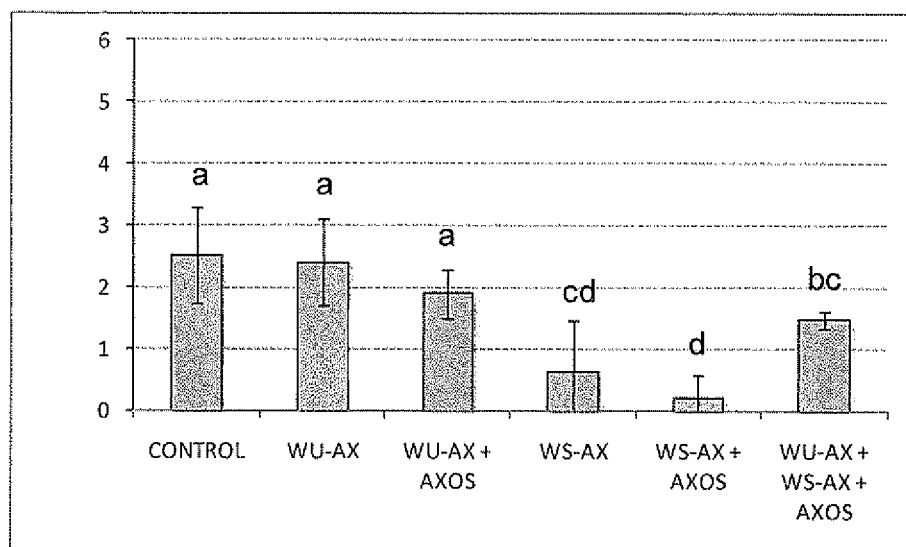

FIG. 2: Effect of different types of arabinoxylans and their additive combinations on the summed concentrations of isovalerate and isobutyrate in the colon of rats after 14 days of feeding. Concentrations are expressed in mmol per kg on fresh weight basis of colon content. Error bars indicate the standard deviation. Different letters above the bars indicate significant difference at $p<0.05$.

Figure 3:
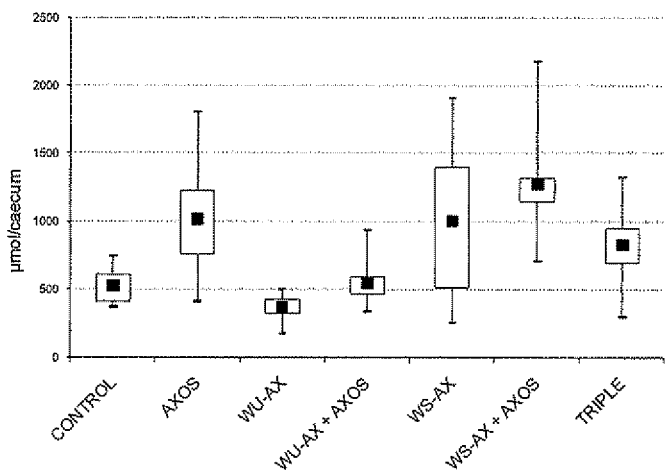
Figure 3:
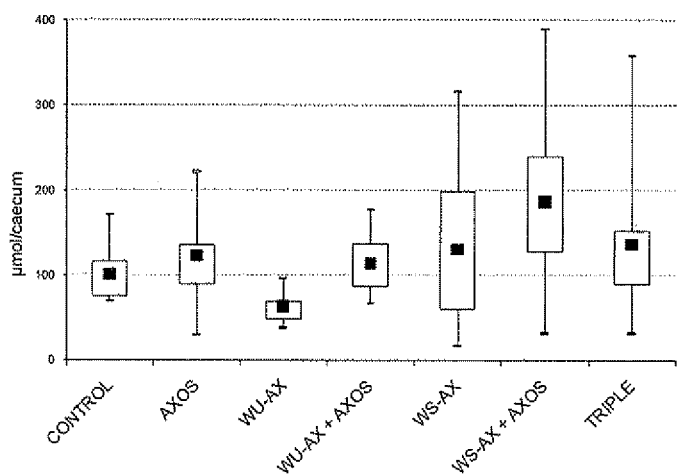
Figure 3:
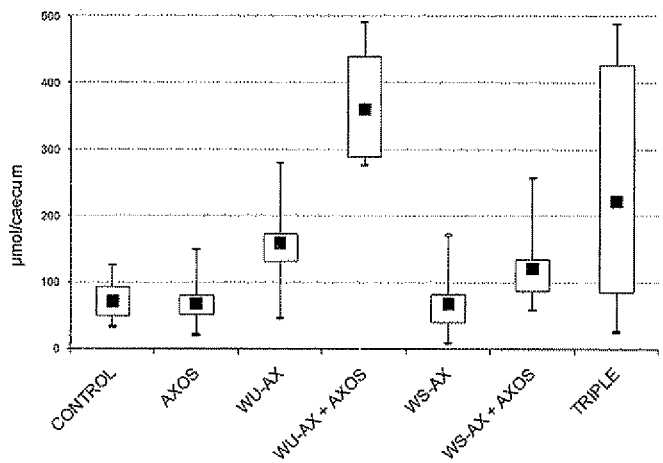

FIG. 3: Effect of different types of arabinoxylans and their combinations at equal total doses on the concentration of acetate (A), propionate (B) and butyrate (C) in the caecum of rats after 14 days of feeding. The label "Triple" indicates the combination of AXOS, WU-AX and WS-AX. Concentrations are expressed in pmol per caecum. The box represents the 0.25 and 0.75 quartiles; the median is the black square in the box; the whiskers are at the minimum and maximum values.

Figure 4:
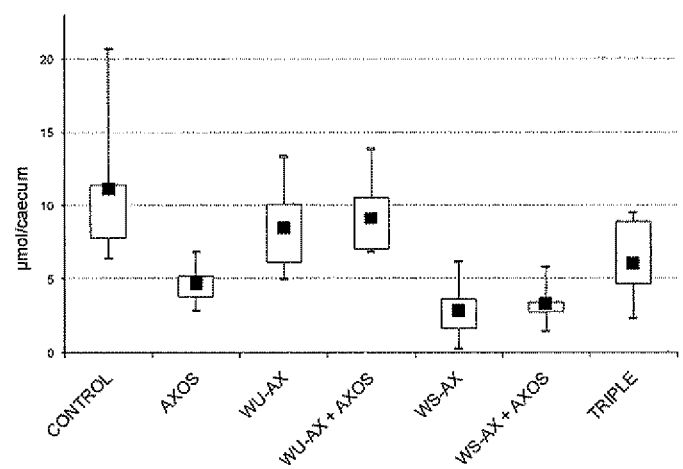

FIG. 4: Effect of different types of arabinoxylans and their additive combinations at equal total doses on the summed concentrations of isovalerate and isobutyrate in the colon of rats after 14 days of feeding. The label "Triple" indicates the combination of AXOS, WU-AX and WS-AX. Concentrations are expressed in pmol per caecum. The box represents the 0.25 and 0.75 quartiles; the median is the black square in the box; the whiskers are at the minimum and maximum values.

DESCRIPTION

As used herein "arabinoxylan-oligosaccharides" or "AXOS" refers to oligosaccharides derived from arabinoxylans comprising a main chain of $\beta$-1,4-linked D-xylopyranosyl units to which O-2 and/or O-3 $\alpha$-L-arabino-furanosyl units can be linked. AXOS preparations derived from arabinoxylans typically contain unsubstituted $\beta$-1,4-linked D-xylopyranoside oligosaccharides (xylo-oligosaccharides or XOS) as well as L-arabino-furanosyl substituted $\beta$-1,4-linked D-xylopyranoside oligosaccharides, and mixtures containing both molecular entities are also referred to as AXOS. For the purpose of the present invention it is preferred that the average degree of arabinose substitution of the arabinoxylan-oligosaccharides varies between 0.15 and 1.0, more preferably between 0.15 and 0.50. Preferably, the average degree of polymerisation of the arabinoxylan-oligosaccharides varies between 3 and 50, more preferably between 3 and 20, for instance between 3 and 10 or between 3 and 8. Typically the arabinoxylan-oligosaccharides or AXOS can be solubilised in a sufficient amount of water at a temperature between 70° C. and 100° C., and remain soluble after cooling to 70° C. and addition of ethanol to a final concentration of 70% (v/v) at 70° C. Arabinoxylan-oligosaccharides suitable for use in the method according to the present invention can be obtained by partial hydrolysis of arabinoxylans extracted from cereals or cereal derived material. More preferably, the arabinoxylan-oligosaccharides are obtained by hydrolysis of arabinoxylans from bran, for instance wheat or rye bran.

As used herein "water-soluble arabinoxylans" or "WS-AX" refers to arabinoxylan molecules, which can be solubilised in a sufficient amount of water at a temperature between 70° C. and 100° C., but become insoluble after cooling to 70° C. and addition of ethanol to a final concentration of 70% (v/v) at 70° C. These water-soluble arabinoxylans preferably have an average degree of arabinose substitution between 0.15 and 1.0, more preferably between 0.15 and 0.70. The degree of polymerisation of these water-soluble arabinoxylans typically exceeds 50 and can go up to 15000, corresponding to a molecular weight of about 2 million. Given the very high viscosity of the high molecular weight WS-AX it is preferred that the WS-AX for use in the present invention have an average degree of polymerization between 50 and 1000, more preferably between 50 and 500, for instance between 100 and 400. WS-AX are naturally present in many cereals and cereal flours. Particularly high amounts of WS-AX are found in most rye varieties and in more rare cases in some wheat varieties such as for example the variety Yumai-34, as well as in meal, flour, bran or other milling fractions derived thereof. Moreover, the WS-AX content of cereal flour, meal, bran or other milling fraction can be increased by mixing an appropriate amount of an enzyme preparation comprising endoxylanase activity in said flour, meal or bran and subsequently incubating said moistened mix during an appropriate period of time. During the incubation period a fraction of the water-unextractable arabinoxylans comprised in said flour, meal or bran is solubilised. Preferably, said enzyme preparation further comprises at least one endoxylanase which is highly selective for WU-AX. Preferably the enzyme preparation is added at an amount sufficient to increase the WS-AX content in the cereal flour, meal, bran or other milling fraction by at least 25%, preferably by at least 50%, more preferably by at least 100%, and up to 500%, while the WU-AX content is reduced by the corresponding amount. WS-AX can also be derived from cereal flour, meal, bran or other milling fraction containing water-unextractable arabinoxylans by treating such cereal material with an alkaline aqueous solution at a pH in excess of 11. The alkaline solution causes solubilisation of part of the water-unextractable arabinoxylan, and the solubilised arabinoxylans behave as WS-AX and are referred to as alkali solubilised arabinoxylans (AS-AX).

As used herein "water-unextractable arabinoxylans" or "WU-AX" refers to arabinoxylan molecules, which can not be solubilised in water at a temperature between 70° C. and 100° C. These water-unextractable arabinoxylans may preferably have an average degree of arabinose substitution between 0.1 and 1.3, more preferably between 0.35 and 1.0. The average degree of polymerisation of these water-unextractable arabinoxylans typically exceeds 200. WU-AX are present in relatively high amounts in most cereals and the flour, meal and/or bran derived thereof. Particularly, bran is a good source of WU-AX.

As used herein "thermostable amylase" refers to an amylase enzyme (EC 3.2.1.1) whose optimal temperature for activity is at least 70° C., such as between 70° C. and 80° C., or such as between 80° C. and 90° C., or such as between 90° C. and 100° C.

The term "cereal", in the context of the present invention, refers to plants of the botanical family of the Poaceae, including but not limited to species such a wheat, barley, oat, rye, sorghum, maize, and rice.

The term "bran" in the context of the present invention, means a cereal grain-derived milled fraction enriched in any or all of the tissues to be selected from aleurone, pericarp, seed coat, sepals, and petals, as compared to the corresponding intact cereal grain.

As used herein "serving size" refers to the recommended portion of a food product to be eaten in a single sitting. Typically, information on the serving size is provided on the packaging of most food products as an element of the nutrition label. For certain food products it is a practice to package food products in individual units comprising an amount of food product corresponding to the serving size.

As used herein "processed food product" refers to any kind of food product resulting from the transformation of raw ingredients into food for consumption by humans. Processed foods are generally produced by the food industry in such way that they are suitable for consumption without or with minimal further processing. The further processing steps are for instance limited to adding a liquid, such as water or milk and/or heating the product? Such processed foods are typically marketed in a dedicated packaging, which either comprises a single or multiple serving sizes of the food product. Furthermore, the packaging of processed foods carries a food label providing information on the ingredients of the product and its nutritional composition as well as on the recommended serving size of the product. Examples of processed foods include baked goods, dairy products, pasta products, ready to eat cereals, fruit preparations, fruit juices, nectars, smoothies, processed meat products and confectionary, including chocolate products. In a particular embodiment processed foods include processed cat or dog food such as canned preparations or bagged extruded pellets.

As used herein "baked goods" refers to any kind of baked product prepared from dough, sponge and dough or batter, either of a soft or a crisp character, either of a white, light or dark type. The dough or batter is generally a flour dough or batter comprising wheat meal or wheat flour and/or other types of meal, flour or starch such as corn flour, corn starch, rye meal, rye flour, oat flour, oat meal, soy flour, sorghum meal, sorghum flour, rice starch, rice flour, potato meal, potato flour or potato starch. The dough or batter is generally leavened by the addition of a suitable microbial culture, preferably yeast culture, such as a culture of *Saccharomyces cerevisiae* (baker's yeast) or by the addition of a chemical leavening agent, such as sodium bicarbonate. The dough may be fresh, frozen or par-baked. Preferred edible dough based baked goods include bread (in particular white, wheat, wholemeal, low-carb, brown, multi-grain, dark and rye bread), typically in the form of loaves, buns or rolls, and more preferably, pan bread, hamburger buns, French baguette-type bread, pita bread, tortillas, sponge cakes, pancakes, biscuits, crackers cookies, pie crusts, crisp bread, steamed bread, pizza crust and the like. The dough or batter may also comprise other conventional dough ingredients, e.g.: proteins, such as milk or milk powder, gluten, and soy; eggs (either whole eggs, egg yolks or egg whites); shortening such as granulated fat or oil; an oxidant such as ascorbic acid, potassium bromate, potassium iodate, azodicarbonamide (ADA) or ammonium persulfate; a reducing agent such as L-cysteine; a sugar; a salt such as sodium chloride, calcium acetate, sodium sulfate or calcium sulfate. The dough may further comprise an emulsifier such as mono- or diglycerides, diacetyl tartaric acid esters of mono- or diglycerides, sugar esters of fatty acids, polyglycerol esters of fatty acids, lactic acid esters of monoglycerides, acetic acid esters of monoglycerides, polyoxyethylene stearates, phospholipids, lecithin and lysolecithin.

The present invention is based on the findings of a comparative study of the effects of different types of arabinoxylan molecules and combinations thereof on parameters related to gastrointestinal health. In an animal model, predictive for humans and other monogastric vertebrates, the prebiotic and intestinal health related effects of the administration of xylan or arabinoxylan polysaccharides vary according to the physico-chemical properties and molecular weight of these molecules. It was surprisingly found that the combined administration of AXOS and WU-AX through the diet resulted in a synergistic increase of the production of butyrate in the large intestine. This finding was of particular interest given the importance of butyrate as a primary energy source for the epithelial cells of the colon and considering the growing evidence that the ability to form butyrate in the large intestine correlates with the colon cancer suppressing properties of non-digestible carbohydrates (Perrin et al., 2001; McIntosh et al., 2001; Wong et al., 2006).

So a first object of the present invention is to provide a novel nutritional composition comprising appropriate amounts of both AXOS and WU-AX wherein the gastrointestinal administration of said nutritional composition provides a desired increase of the butyrate production in the large intestine. The nutritional composition of the invention may be in any form suitable for human administration, and in particular suitable for administration to the gastrointestinal tract. Usually, and preferably, this involves compositions suitable for oral administration, although a composition for direct administration into the gut such as via tube or catheter also forms part of the invention. The nutritional composition of the invention may also be in a form suitable for oral administration to cats or dogs, which in the Western world are increasingly fed highly processed pet foods.

Preferably, said nutritional composition comprises on a dry weight basis between 1% (w/w) and 80% (w/w) of AXOS and between 1% (w/w) and 35% (w/w) of WU-AX. More preferably the AXOS content of said nutritional composition is more than 1.5% (w/w), most preferably more than 2.5% (w/w), such as for instance more than 3%, 4%,5%, 7.5% or 10% (w/w) on a dry weight basis. It is also more preferred that the WU-AX content of said nutritional composition is more than 1.5% (w/w), most preferably more than 2.5% (w/w), such as for instance more than 3%, 4%, 5%, 7.5% or 10% (w/w) on a dry weight basis. Optionally, a nutritional composition according to the present invention further comprises between 0.75% (w/w) and 80% (w/w) of WS-AX. More preferably, said nutritional composition comprises more than 1% (w/w), more preferably more than 1.25% (w/w), such as for instance more than 1.5%, 2% or 3% (w/w) of WS-AX on a dry weight basis.

In a preferred embodiment the nutritional composition of the present invention is a food supplement. Preferably such food supplement comprises between 5% (w/w) and 80% (w/w) of AXOS and between 2.5% (w/w) and 35% (w/w) of WU-AX on a dry weight basis. More preferably the AXOS content of such food supplement is more than 5% (w/w), more preferably more than 10% (w/w), for instance more than 20%, 30% or 40% (w/w) and preferably not more than 80% (w/w), for instance less than 70% (w/w) or 60% (w/w) on dry weight. It is also more preferred that the WU-AX content of such food supplement is more than 2.5% (w/w), more preferably more than 5% (w/w), for instance more than 10%, 15% or 20% (w/w) and preferably not more than 35% (w/w), for instance less than 30% (w/w) or 25% (w/w) on dry weight.

Optionally, said food supplement may further comprise between 1% (w/w) and 80% (w/w) of WS-AX. More preferably the WS-AX content of such food supplement is more than 5% (w/w), more preferably more than 10% (w/w), for instance more than 20%, 30% or 40% (w/w) and preferably not more than 80% (w/w), for instance less than 70% (w/w) 60% or 50% (w/w) on dry weight.

Overall the food supplement according to the present invention preferably comprises between 20% (w/w) and 90% (w/w), more preferably between 30% (w/w) and 80% (w/w), for instance between 40% (w/w) and 70% (w/w) of both arabinoxylans and AXOS on dry weight. The remainder may be other non-digestible carbohydrates, starch, sugars, proteins, minerals, fats, colorants, preservatives and the like.

The food supplement of the present invention can be in a form for separate administration, such as a capsule, tablet, a powder, a sachet, a liquid composition or a similar form. Such a supplement may further comprise one or more adjuvants, carriers or excipients suitable for use in food supplements, as well as one or more of the further components and/or additives described above.

The food supplement may also be in the form of a powder, a liquid composition or a similar form, which is added to or mixed with a suitable food or a suitable liquid or solid carrier, for the preparation of a food or drink which is ready for consumption. For instance, the food supplement may be in the form of a powder which can be mixed with or suspended in for instance water, milk, fruit juice amongst others. It can also be in the form of a powder or liquid that can be mixed with solid foods or with foods with a high-water-content, such as soft cheese or fermented foods, for example yoghurt.

In another preferred embodiment the nutritional composition of the present invention is a processed food product, including drinkable products. Preferably, such processed food product comprises between 1% (w/w) and 25% (w/w) of AXOS and between 1% (w/w) and 25% (w/w) of WU-AX on a dry weight basis. More preferably the AXOS content of such processed food product is more than 1.5% (w/w), most preferably more than 2.5% (w/w), such as for instance more than 3%, 4%, 5%, 7.5% or 10% (w/w) and preferably not more than 25% (w/w), for instance less than 20% (w/w) or 15% (w/w) on dry weight. It is also more preferred that the WU-AX content of such food supplement is more than 1.5% (w/w), most preferably more than 2.5% (w/w), such as for instance more than 3%, 4%, 5%, 7.5% or 10% (w/w) and preferably not more than 25% (w/w), for instance less than 20% (w/w) or 15% (w/w) on dry weight.

Optionally, said processed food product may further comprise between 0.75% (w/w) and 15% (w/w) of WS-AX. More preferably the WS-AX content of such processed food product is more than 1% (w/w), more preferably more than 1.25% (w/w), for instance more than 1.5%, 2% or 3% (w/w) and preferably not more than 15% (w/w), for instance less than 12% (w/w) or 10% (w/w) on dry weight.

In a more preferred embodiment said processed food product comprises between 1 and 15 g of WU-AX and between 1 and 10 g of AXOS per serving size of said processed food product. More preferably such processed food product comprises more than 1, more preferably more than 2 g, for instance more than 2.5, 3 or 4 g of AXOS per serving size and preferably not more than 10 g, for instance less than 8 g or 5 g AXOS per serving size. It is also more preferred that such processed food product comprises more than 1, more preferably more than 2 g, for instance more than 2.5, 3, 4, 5 or 6 g of WU-AX per serving size and preferably not more than 15 g, for instance less than 12 or 10 g WU-AX per serving size. Optionally, said processed food product further comprises between 0.3 and 10 g of WS-AX per serving. Preferably such processed food product comprises more than 0.3, more preferably more than 0.75 g, for instance more than 1, 1.5, 2, 2.5, 3 or 4 g of WS-AX per serving and preferably not more than 10 g, for instance less than 8 or 5 g WS-AX per serving.

In a particular embodiment processed food products according to the present invention are baked goods such as bread, cookies, breakfast cookies, crackers, sponge cake, pizza's, cakes, muffins, pastries, including toaster pastries amongst others. The serving size of these products vary according to the product. The serving size of bread typically varies between 80 and 100 g, while the serving size of cookies, breakfast cookies, cakes and pastry is typically between 30 and 50 g. The serving size of crackers is typically between 15 and 30 g. Such baked goods may comprise fillings, coatings and/or toppings, however, when determining the AXOS, WS-AX or WU-AX content on a dry weight basis for such products, the dry weight of these toppings, coatings and/or fillings should be subtracted from the total weight of the processed food product. In another particular embodiment a processed food product according to the present invention is a ready to eat cereal, including cereal bars, muesli and granola. The typical serving sizes of ready to eat cereals vary between 30 and 50 g, this serving size does not include the milk or other dairy product or dairy substitute, which can be added to the cereals. In yet another particular embodiment a processed food product according to the present invention is a pasta product. Typical serving sizes for pasta products vary between 80 and 125 g of the dry pasta, excluding any sauce, cheese, meat or other ingredients added. In yet another particular embodiment a processed food product according the present invention is a dairy product, such as milk, milk-based drink, yoghurt, drink yoghurt and soft cheese amongst others. The serving size of yoghurt varies between 100 and 200 g, while a typical serving of milk, milk-based drinks and drink yoghurt is about 200 g. Generally the serving sizes of soft cheese products vary between 100 and 150 g. In yet another particular embodiment a processed food product according the present invention is a fruit-based drink, such as a smoothie. The serving size of a fruit-based drink is typically between 150 and 300 g.

A second object of the present invention is to provide the use of any of the nutritional compositions as described above for stimulating the butyrate production in the intestine upon gastrointestinal administration of said nutritional compositions. Without being tied by any theory it is assumed that this increased butyrate production is the result of a modulating action on the intestinal microflora of the combined presence in the intestine of both WU-AX and AXOS.

Further it was interestingly found that the combined administration of AXOS and WS-AX through the diet had a surprisingly potent inhibitory effect on the intestinal protein fermentation combined with a positive effect on the butyric acid production. So in a third object the present invention provides a nutritional composition enriched with both AXOS and WS-AX. Preferably, said nutritional composition comprises on a dry weight basis between 1% (w/w) and 80% (w/w) of AXOS and between 1% (w/w) and 80% (w/w) of WS-AX. More preferably the AXOS content of said nutritional composition is more than 1.5% (w/w), most preferably more than 2.5% (w/w), such as for instance more than 3%, 4%, 5%, 7.5% or 10% (w/w) on a dry weight basis. It is also more preferred that the WS-AX content of said nutritional composition is more than 1.5% (w/w), most preferably more than 2.5% (w/w), such as for instance more than 3%, 4%, 5%, 7.5% or 10% (w/w) on a dry weight basis. Optionally, a nutritional composition according to the present invention further comprises between 1% (w/w) and 35% (w/w) of WU-AX on dry weight. More preferably, said nutritional composition comprises more than 1% (w/w), more preferably more than 1.25% (w/w), such as for instance more than 1.5%, 2% or 3% (w/w) of WU-AX on a dry weight basis.

In a preferred embodiment the nutritional composition according to the third object of the present invention is a food supplement. Preferably such food supplement comprises between 10% (w/w) and 80° A, (w/w) of AXOS and between 10% (w/w) and 80% (w/w) of WS-AX on a dry weight basis. More preferably the AXOS content of such food supplement is more than 10% (w/w), for instance more than 20%, 30% or 40% (w/w) and preferably not more than 80% (w/w), for instance less than 70%, 60% or 50% (w/w) on dry weight. It is also more preferred that the WS-AX content of such food supplement is more than 2.5% (w/w), more preferably more than 10% (w/w), for instance more than 20%, 30% or 40% (w/w) and preferably not more than 80% (w/w), for instance less than 70%, 60% or 50% (w/w) on dry weight.

Optionally, said food supplement may further comprise between 1% (w/w) and 35% (w/w) of WU-AX. More preferably the WU-AX content of such food supplement is more than 1.5% (w/w), most preferably more than 2.5% (w/w), such as for instance more than 3%, 4%, 5%, 7.5% or 10% (w/w) and preferably not more than 25% (w/w), for instance less than 20% (w/w) or 15% (w/w) on dry weight.

Overall the food supplement according to the present invention preferably comprises between 20% (w/w) and 90% (w/w), more preferably between 30% (w/w) and 80% (w/w), for instance between 40° A, (w/w) and 70% (w/w) of both arabinoxylans and AXOS on dry weight. The remainder may be other non-digestible carbohydrates, starch, sugars, proteins, minerals, fats, colorants, preservatives and the like.

The food supplement of the present invention can be in a form for separate administration, such as a capsule, tablet, a powder, a sachet, a liquid composition or a similar form. Such a supplement may further comprise one or more adjuvants, carriers or excipients suitable for use in food supplements, as well as one or more of the further components and/or additives described above.

The food supplement may also be in the form of a powder, a liquid composition or a similar form, which is added to or mixed with a suitable food or a suitable liquid or solid carrier, for the preparation of a food or drink which is ready for consumption. For instance, the food supplement may be in the form of a powder which can be mixed with or suspended in for instance water, milk, fruit juice amongst others. It can also be in the form of a powder or liquid that can be mixed with solid foods or with foods with a high-water-content, such as soft cheese or fermented foods, for example yoghurt.

In another preferred embodiment the nutritional composition according to the third object of the present invention is a processed food product. Preferably, such processed food product comprises between 0.75 and 15% (w/w) of WS-AX and between 1.0 and 15% AXOS on a dry weight basis. More preferably the AXOS content of such processed food product is more than 1.5% (w/w), most preferably more than 2.5% (w/w), such as for instance more than 3%, 4%, 5%, 7.5% or 10% (w/w) and preferably not more than 25% (w/w), for instance less than 20% (w/w) or 15% (w/w) on dry weight. It is also more preferred that the WS-AX content of such food supplement is more than 0.75% (w/w), most preferably more than 2.5% (w/w), such as for instance more than 3%, 4%, 5%, 7.5% or 10% (w/w) and preferably not more than 15% (w/w), for instance less than 12% (w/w) on dry weight.

Optionally, said processed food product may further comprise between 0.75% (w/w) and 15% (w/w) of WU-AX. More preferably the WU-AX content of such processed food product is more than 1% (w/w), more preferably more than 1.25% (w/w), for instance more than 1.5%, 2% or 3% (w/w) and preferably not more than 15% (w/w), for instance less than 12% (w/w) or 10% (w/w) on dry weight.

In a preferred embodiment such processed food product according to the third object of the present invention is a processed food product comprising between 0.3 and 15 g of WS-AX and between 1 and 10 g of AXOS per serving size of said processed food product. Preferably such processed food product comprises more than 1 g, more preferably more than 2 g, for instance more than 3 g or 4 g of AXOS per serving and preferably not more than 10 g, for instance less than 8 g or 5 g AXOS per serving. Preferably such processed food products comprise more than 0.3, more preferably more than 0.75 g, for instance more than 1, 2, 3 or 4 g of WS-AX per serving and preferably not more than 10 g, for instance less than 8 g WS-AX per serving. Optionally, such processed food product further comprises between 0.3 and 20 g of WU-AX per serving. Preferably such processed food product comprises more than 0.5, more preferably more than 0.75 g, for instance more than 1, 2, 3 or 5 g of WU-AX per serving and preferably not more than 15 g, for instance less than 10 g WU-AX per serving.

In a particular embodiment processed food products according to the third object of the present invention are baked goods such as bread, cookies, breakfast cookies, crackers, sponge cake, pizza's, muffins, pastries, including toaster pastries amongst others. Such baked goods may comprise fillings, coatings and/or toppings, however, when determining the AXOS, WS-AX or WU-AX content on a dry weight basis for such products, the dry weight of these toppings, coatings and/or fillings should be subtracted from the total weight of the processed food product In another particular embodiment a processed food product according to the third object of the present invention is a ready to eat cereal, including cereal bars, muesli and granola. In yet another particular embodiment a processed food product according to the third object of the present invention is a pasta product. In yet another particular embodiment a processed food product according to the third object of the present invention is a dairy product, such as milk, milk-based drink, yoghurt, drink yoghurt and soft cheese amongst others. In yet another particular embodiment a processed food product according to the third object of the present invention is a fruit-based drink, such as a smoothie.

The present invention further provides the use of preparations enriched in AXOS for the production of any of the nutritional compositions as specified above. Preferably such AXOS enriched preparation comprises more than 15% (w/w), more preferably more than 30% (w/w), most preferably more than 40% (w/w), for instance more than 50%, 60% or 70% (w/w) and up to 99% (w/w), such as up to 90 or 85% (w/w) of AXOS on a dry weight basis. It is preferred that the average degree of arabinose substitution of the AXOS in such preparation varies between 0.15 and 1.0, more preferably between 0.15 and 0.50, most preferably between 0.15 and 0.30. Preferably, the average degree of polymerisation of the AXOS comprised in such preparation varies between 3 and 50, more preferably between 3 and 20, for instance between 3 and 10 or between 3 and 8.

The present invention also provides the use of a preparation rich in WU-AX for the production of any of the WU-AX-containing nutritional compositions as specified above. Preferably such WU-AX rich preparations comprises more than 10% (w/w), more preferably more than 15% (w/w), most preferably more than 20% (w/w), for instance more than 30% or 40% (w/w) and up to 60% (w/w), such as up to 50% or 45% (w/w) of WU-AX on a dry weight basis. In a preferred embodiment such WU-AX rich material is a cereal bran, such as wheat, rye, maize or rice bran. In a more preferred embodiment the water-soluble components are extracted from said bran in order to increase the relative concentration of WU-AX in said bran. In an even more preferred embodiment a substantial fraction of either or both the protein or starch material is extracted from said bran, for instance through the use of a protease and an amylase, respectively.

The present invention further provides the use of materials rich in WS-AX for the production of WS-AX-containing nutritional compositions as specified above. Such WS-AX rich material can be a flour, meal or other milling fraction of a wheat variety, such as Yumai-34, or rye naturally rich in WS-AX. Typically such flour, meal or other milling fraction of wheat or rye comprises between 1.5% and 8% (w/w) of WS-AX on a dry weight basis. Alternatively, cereal derived material processed to be enriched in WS-AX can be used. Preferably such WS-AX enriched preparations comprises more than 15% (w/w), more preferably more than 30% (w/w), most preferably more than 40% (w/w), for instance more than 50%, 60% or 70% (w/w) and up to 99% (w/w), such as up to 90 or 85% (w/w) of WS-AX on a dry weight basis.

Furthermore, cereal materials such as flour, meal or other milling fractions of a cereal can be processed such that at least part of WU-AX comprised in such cereal material is transformed into WS-AX. Preferably, said cereal material is treated using an exogenous endoxylanase preparation at a dose, which allows to increase by at least 50%, such as by 100% and up to 500% the WS-AX content naturally present in said cereal fraction. Possibly, the endoxylanase treatment of the said cereal material can be done during the production of the processed food product.

The AXOS content of a nutritional composition of the present invention is preferably determined as the sum of all bound xylose and arabinose in the soluble phase obtained after extracting said nutritional composition with hot water at a temperature between 95° C. and 100° C. during at least 30 minutes in the presence of a thermostable amylase and to which, after cooling to 70° C., ethanol has been added to a final concentration of 70/30 (v/v) ethanol/water. The WU-AX content of a nutritional composition according to the present invention is preferably measured as the sum of all bound arabinose and xylose retained in the residue obtained after extracting said nutritional composition with hot water at a temperature between 95° C. and 100° C. during at least 30 minutes in the presence of a thermostable amylase followed by cooling the extract to 70° C. The WS-AX content of a nutritional composition of the present invention is preferably determined as the sum of all bound arabinose and xylose in the soluble phase obtained after extracting said nutritional composition with hot water at a temperature between 95° C. and 100° C. during at least 30 minutes in the presence of a thermostable amylase and after cooling said extract to 70° C. minus the AXOS content comprised in said nutritional composition. Methods for measuring WU-AX and AXOS in nutritional compositions are further described in Example 1.

The invention is further illustrated by way of the illustrative embodiments described below.

Illustrative Embodiment

EXAMPLES

Example 1

Effect on Intestinal Parameters of WU-AX, WS-AX and AXOS Preparations and Additive Combinations Thereof Materials and Methods
Preparation of AXOS.

AXOS was prepared by FUGEIA NV (Leuven, Belgium) from wheat bran by endoxylanase treatment (see Swennen et al., 2006). After clarification using a disc centrifuge and after heat inactivation of the enzyme, the supernatant was filtered and purified by passage over anion exchange and cation exchange resins. Finally, the solution was concentrated and spray-dried. The clarification and ion exchange resin purification steps are not essential for the properties of AXOS described in the present invention. The composition and characterisation of the AXOS preparation is shown in Table 1.

Preparation of WS-AX.

WS-AX was prepared from commercial wheat bran by treating wheat bran suspended in demineralised water (8 liter water per kg dry matter) with a commercial amylase (BAN 480 L, Novozymes, Bagsvaerd, Denmark; 1 ml enzyme preparation per kg dry matter) at 70° C. under constant stirring for 90 minutes, followed by filtering and extensive rinsing of the residue with demineralised water. The destarched bran was then suspended in demineralised water (10 liter water per kg dry matter) and treated with a commercial xylanase (Multifect CX 12 L, Danisco, Copenhagen, Denmark; 0.25 ml enzyme preparation per kg dry matter) at 50° C. under constant stirring for 8 h. The liquid phase was recovered after filtration. After inactivation of the enzyme by treatment of the filtrate for 10 minutes at 90° C., the solution was concentrated in a falling film evaporator and finally dried in a spray-drier. The composition and characterisation of the WS-AX preparation is shown in Table 1.

Preparation of WU-AX.

WU-AX was prepared from commercial wheat bran by treating wheat bran suspended in demineralised water (10 liter water per kg dry matter) with a commercial amylase (Termamyl 120 L, Novozymes, Bagsvaerd, Denmark; 1 ml enzyme preparation per kg dry matter) at 90° C. for 90 minutes. After cooling of the mash to 50° C., the pH of the mash was adapted to pH 6.0 by addition of HCl and treated with a commercial protease (Neutrase 0.8 L Novozymes, Bagsvaerd, Denmark; 40 ml enzyme preparation per kg dry matter) at 50° C. under constant stirring for 4 h. The mash was heated to 100° C. and kept at this temperature for 10 minutes. After cooling to 60° C., the mash was filtered, the residue washed extensively with demineralised water, and finally dried in a lyophilisator. The composition and characterisation of the WU-AX preparation is shown in Table 1.

Characterisation of Saccharides.

The content of total saccharides, reducing end saccharides, and free monosaccharides was determined by gas-liquid chromatographic analysis as described by Courtin et al. (2000). For determination of total saccharide content, 40 mg dry samples suspended in 2.5 ml distilled water or 2.5 ml saccharide-containing water extracts of samples were hydrolyzed by mixing with 2.5 ml 4.0 M trifluoroacetic acid and incubating at 110° C. for 60 minutes. After the hydrolysis, the mixture was filtered and 3.0 ml of the filtrate was further treated by adding 1.0 ml of an internal standard solution (100 mg beta-D-allose in 100 ml of a 50% saturated benzoic acid solution), 1.0 ml of ammonia solution (25% v/v) and 3 drops of 2-octanol. The monosaccharides were reduced to alditols by addition of 200 µl of sodium borohydride solution (200 mg sodium borohydride in 1.0 ml 2 M ammonia) and the sample was incubated for 30 minutes at 40° C. The reaction was stopped by addition of 400 µl of glacial acetic acid, For the acetylation reaction, 500 µl of the sample containing the alditols was added to 5.0 ml of acetic anhydride and 500 µl of 1-methyl-imidazole. After 10 minutes, the excess of acetic anhydride was removed by addition of 900 µl ethanol to the sample. Alditol acetates were then concentrated in the organic phase by addition of water (10 ml) and potassium hydroxide solution (2 times 5.0 ml of 7.5 M solution, with an intermediate rest of a few minutes). Bromophenol blue solution (500 µl, 0.04% w/v) was added as indicator for the aqueous phase. Aliquots of 1 µl of the organic phase containing the formed alditol acetates were separated by gas chromatography on a Supelco SP-2380 polar column (30 m×0.32 mm 1.D.; 0.2 pm film thickness) (Supelco, Bellefonte, PA, USA) in an Agilent chromatograph (Agilent 6890 series, Wilmington, Del., USA) equipped with autosampler, splitter injection port (split ratio 1:20) and flame ionisation detector. The purified monosaccharides D-glucose, D-mannose, D-galactose, D-xylose, and L-arabinose were treated in parallel with each set of samples for calibration purposes, and calibration took into account partial degradation of the monosaccharide standards during the hydrolysis step (6% for D-glucose, 8% for D-mannose, 6% for D-galactose, 11% for D-xylose, and 5% for L-arabinose).

For determination of the reducing end saccharide content, 40 mg dry samples suspended in water or 2.5 ml saccharide-containing water extracts of samples, were mixed with 500 µl of an internal standard (100 mg beta-D-allose in 100 ml of a 50% saturated benzoic acid solution) and 50 µl ammonia solution (25% vlv) and 9 drops of 2-octanol. The saccharides were reduced to alditols by addition of 200 µl of sodium borohydride solution (200 mg sodium borohydride in 1.0 ml 2 M ammonia) and the sample was incubated for 30 minutes at 40° C. The reaction was stopped by the addition of 400 µl glacial acetic acid. An aliquot of 2.5 ml of the sample containing reduced saccharides was hydrolyzed by addition of 500 µl trifluoroacetic acid (99%) and the sample was incubated at 110° C. for 60 minutes. After hydrolysis, acetylation and gas chromatography analysis was performed as described above. The purified monosaccharides D-glucose, D-mannose, D-galactose, D-xylose, and L-arabinose were treated in parallel with each set of samples for calibration purposes.

For determination of the free monosaccharide content, 40 mg dry samples suspended in water or 2.5 ml saccharide-containing water extracts of samples, were mixed with 500 µl of an internal standard (100 mg beta-D-allose in 100 ml of a 50% saturated benzoic acid solution) and 50 µl ammonia solution (25% vlv) and 9 drops of 2-octanol. The saccharides were reduced to alditols by addition of 200 µl of sodium borohydride solution (200 mg sodium borohydride in 1.0 ml 2 M ammonia) and the sample was incubated for 30 minutes at 40° C. The reaction was stopped by the addition of 400 µl glacial acetic acid. An aliquot of 2.5 ml of the sample containing reduced saccharides was acetylated and analysed by gas chromatography as described above. The purified monosaccharides D-glucose, D-mannose, D-galactose, D-xylose, and L-arabinose were treated in parallel with each set of samples for calibration purposes.

From the above described analyses, the following values were obtained:

% totxyl, % totara, % totgal, % totman, % totglu are the concentrations of total (polymeric and free) xylose, arabinose, galactose, mannose, and glucose, respectively, as determined by the total saccharide analysis procedure.

% redxyl, % redara, % redgal, % redman, % redglu are the concentrations of reducing end xylose, arabinose, galactose, mannose, and glucose, respectively, as determined by the reducing end saccharide analysis procedure.

% freexyl, % freeara, % freegal, % freeman, % freeglu are the concentrations of free xylose, arabinose, galactose, mannose, and glucose, respectively, as determined by the free monosaccharide analysis procedure.

The content of non-cellulosic bound glucose, bound galactose, bound mannose, bound xylose and bound arabinose was calculated by formulae (1), (2), (3), (4), and (5), respectively.

$$(\% \ totglu - \% \ freeglu) * 162/180 \quad (1)$$

$$(\% \ totgal - \% \ freegal) * 162/180 \quad (2)$$

$$(\% \ totman - \% \ freeman) * 1621180 \quad (3)$$

$$(\% \ totxyl - \% \ freexyl) * 132/150 \quad (4)$$

$$(\% \ totara - \% \ freeara) * 132/150 \quad (5)$$

The content of arabinoxylan or AXOS (% AX/AXOS) in a sample was calculated by formula (6).

$$(\% \ totxyl - \% \ redxyl) * 132/150 + (\% \ totara - \% \ freearayl \ 32/150 + (\% \ redxyl - \% \ freexyl) \quad (6)$$

The average degree of polymerisation (avDP) of the arabinoxylan or AXOS was calculated using formula (7).

$$(\% \ totxyl - \% \ freexyl + \% \ totara - \% \ freeara)/(\% \ redxyl - \% \ freexyl) \quad (7)$$

The arabinose to xylose ratio (AIX ratio) of the arabinoxylan or AXOS was calculated using formula (8).

$$(\% \ totara - \% \ freeara)/(\% \ totxyl - \% \ freexyl) \quad (8)$$

Determination of WU-AX, WS-AX and AXOS Content

The content of WU-AX, WS-AX and AXOS content in a sample, for instance a food sample, was determined by the following set of parallel analyses.

The total amount of AX or AXOS (TOT-AX/AXOS) in a sample was determined as follows:

Weigh accurately three 40 mg aliquots of the dry sample with known dry matter content.

Determine the total saccharide, reducing end saccharide and free monosaccharide content on each of the 40 mg samples, respectively.

Calculate the % TOT-AX/AXOS as the % AX/AXOS using the above formula (6) on the basis of 40 mg (multiplied by % dry matter) of the original sample The total amount of water-soluble AX (=WS-AX+AXOS) in a sample was determined by the following procedure:

Weigh accurately about 500 mg of the dry sample with known dry matter content, transfer to a capped centrifuge tube and add 10.8 ml of 50 mM MES/TRIS buffer (pH 8.2)

Place the tubes in a boiling water bath, add 15 µL of a thermostable α-amylase (Termamyl 120LS, Novozymes, Bagsvaerd, Denmark) as soon as the temperature of the liquid in the tubes is at least 80° C., and incubate for 30 minutes at 95-100° C.

Cool down to 60-70° C.

Add 29.2 ml water (preheated at 60° C.) and incubate the tubes in a water bath at 70° C. during 20 minutes with shaking and another 20 minutes without shaking.

Centrifuge the tubes at 4,000×g for 15 minutes

Collect 35 ml of the supernatant and transfer to a clean centrifuge tube

Centrifuge the tubes at 10,000×g for 15 minutes

Collect 30 ml of the supernatant

Determine the total saccharide, reducing end saccharide and free monosaccharide content on the 2.5 ml aliquots of the cleared supernatant samples.

Calculate the % WS-AX/AXOS as the % AX/AXOS using the above formula (6), assuming a sample dry weight of 1000*2.5/40 mg (multiplied by % dry matter) of the original sample.

The total amount of ethanol soluble AX or AXOS (ETS-AX/AXOS) in a sample was determined by the following procedure:

Weigh accurately about 500 mg of the dry sample with known dry matter content, transfer to a capped centrifuge tube and add 10.8 ml of 50 mM MES/TRIS buffer (pH 8.2)

Place the tubes in a boiling water bath, add 15 µL of a thermostable α-amylase (Termamyl 120LS, Novozymes, Bagsvaerd, Denmark) as soon as the temperature of the liquid in the tubes is at least 80° C., and incubate for 30 minutes at 95-100° C.

Cool down to 60-70° C.

Add 29.2 ml of 96% (v/v) ethanol/water (preheated at 60° C.) such that the final ethanol concentration is 70% (v/v), and incubate the tubes in a water bath at 70° C. during 20 minutes with shaking and another 20 minutes without shaking.

Centrifuge the tubes at 4,000×g for 15 minutes

Collect 35 ml of the supernatant and transfer to a clean centrifuge tube

Centrifuge the tubes at 10,000×g for 15 minutes

Collect 30 ml of the supernatant

Evaporate the solvent in a rotavap instrument until about 3 ml is left in the flask. Add 10 ml distilled water at 70° C., swirl well and transfer to a measuring cylinder. Add another 10 ml of distilled water to the rotavapor flask, swirl well and transfer to the same measuring cylinder. Adjust the liquid in the measuring cylinder to 30 ml by addition of distilled water.

Determine the total saccharide, reducing end saccharide and free monosaccharide content on 2.5 ml aliquots of the liquid collected in the measuring cylinder.

Calculate the % ETS-AX/AXOS as the % AX/AXOS using the above formula (6), assuming a sample dry weight of 1000*2.5/40 mg (multiplied by % dry matter) of the original sample.

Calculate the % WU-AX using formula (9)

$$\% \text{ WU-AX} = \% \text{ TOT-AX/AXOS} - \% \text{ WS-AX/AXOS} \quad (9)$$

Calculate the % WS-AX using formula (10)

$$\% \text{ WS-AX} = \% \text{ WS-AX/AXOS} - \% \text{ ETS-AX/AXOS} \quad (10)$$

Calculate the % AXOS using formula (II)

$$\% \text{ AXOS} = \% \text{ ETS-AX/AXOS} \quad (11)$$

Determination of Moisture and Ash Content

Moisture and ash contents were analysed according to AACC methods 44-19 and 08-01, respectively (Approved Methods of the American Association of Cereal Chemist, 10th edition. 2000. The Association, St. Paul, Minn., USA).

Determination of Protein Content

Nitrogen content and deduced protein contents were determined according to the Dumas combustion method, using an automated Dumas protein analysis system (EAS varioMax N/CN, Elt, Gouda, The Netherlands) that follows an adaptation of the AOAC Official Method for protein determination (Association of Official Analytical Chemists. Official Methods of Analysis, 16th edition. 1995. Method 990.03. AOAC Washington D.C., USA). The protein content was deduced by multiplying the nitrogen content with the factor 6.25.

Animal Trial Conditions.

6-week-old male rats (Wistar) were purchased from Elevage Janvier (Le Genest-St-isle, France) and randomly assigned to 6 groups of 10 rats each. The rats were housed in stainless steel wire-bottom cages (2 rats per cage) in an environmentally controlled room (22° C.) with a 14-10 h light-dark cycle. Rats were given free access to water and to pellets (10 mm) of the 'control' diet (Table 2) during 6 days. After 6 days of adaptation on the control diet, the rats were randomly assigned to one of 6 different treatment groups (10 rats/group), and the groups were each given free access during 14 days to pellets (10 mm) of one of the 6 diets described in Table 2.

Animals were weighed and feed intake was measured 3 times per week. After 14 days of treatment, all animals were weighed and euthanized by carbon dioxide asphyxiation. Thereafter, the animals were dissected to collect the caecum and colon content.

Short chain fatty acid analysis. To vials containing intestinal samples (2 g) the following was added: 0.5 ml 9.2 M sulfuric acid, 0.4 ml of 0.75% (v/v) 2-methylhexanoic acid (internal standard), 0.4 g NaCI and 2 ml diethyl ether. After shaking the vials for 2 minutes, the vials were centrifuged (3 min at 3000×g) and the diethyl ether phase transferred to glass vials. The diethyl ether phase containing the organic acids was analysed on a gas-liquid chromatograph equipped with a EC-1000 Econo-Cap column (Alltech, Laarne, Belgium; dimensions: 25 m×0.53 mm, film thickness 1.2 µm; acid-modified polyethylene glycol as liquid phase) and a flame ionization detector. Nitrogen was used as a carrier gas at a flow rate of 20 mL per minute and the column temperature and injector temperature were set at 130 and 195° C., respectively. Concentrations of SCFAs were calculated based on standards with known concentrations of the different acids. 2-Methyl hexanoic acid was used as an internal standard (Van de VViele et al., 2007).

Statistical analyses. The effect of diets on different parameters was analysed by the non-parametric Kruskal-Wallis test at the 95% confidence level using the Analyse-it software, version 2.07. In case a statistically significant effect was observed for the factor diet, differences among each of the diets were analysed with Bonferroni error protection at the 95% confidence level.

Results

Rats were used as an in vivo model to study the effect of dietary inclusion of different types of arabinoxylans in mammalians. To this end, preparations of low molecular weight arabinoxylan-oligosaccharides (AXOS), high molecular weight water-soluble arabinoxylan (WS-AX) and high molecular weight water-unextractable arabinoxylan (WU-AX) were made and characterised (Table 1), The different preparations were added either alone or in additive combinations to different diets (Table 2), and a range of gut health related parameters were assessed after a 14 days feeding period.

No significant differences in body weight or daily feed intake were observed between the different treatments.

As increased intestinal SCFA levels are a hallmark of shifts in the intestinal microflora induced by intake of prebiotic compounds (Macfarlane et al 2006), the concentration of the main SCFA, acetate, propionate and butyrate, were measured in the caecum and colon of rats from the different treatment groups. In addition, since the branched SCFA isobutyrate and isovalerate are formed during the catabolism of branched chain amino acids valine, leucine, isoleucine and are thus considered an indicator of protein fermentation in the gut (Mortensen et al. 1992; Macfarlane and Macfarlane, 1995), the levels of branched SCFA were assessed in caecum and colon of the rats. The data for SCFA levels in caecum and colon are shown in Tables 3 and 4, respectively, and in FIGS. 1 and 2 for colon SCFA levels. In Tables 3 and 4, data are expressed both on fresh and dry weight basis of the caecal or colonic contents. Moreover, since some of the diets caused a significant increase in the amount of caecal content and, albeit to a lesser extent, of colonic content, data were also expressed as pmol of the SCFA per caecum or per colon. The latter presentation of the data is considered to be the biologically most relevant, as it reflects total intestinal fermentation and is not influenced by diet-related variations in the amount of intestinal digesta present in the animals. The most marked changes were observed for butyrate production in both caecum (Table 3) and colon (Table 4, FIG. 1C). WS-AX by itself caused an increase in butyrate produced per caecum and per colon relative to the control diet, and this was further significantly increased in the combination of WS-AX with AXOS in both caecum and colon relative to the diet with WS-AX alone. The combination of WU-AX with AXOS also led to a significant increase in the amount of butyrate produced per caecum relative to WU-AX alone, exceeding butyrate production observed in the WS-AX AXOS combination. Highest butyrate levels were found in caecum and colon of rats fed the diet supplemented with the combination of WU-AX, WS-AX and AXOS.

Significant reductions in colonic branched SCFA levels were observed in all groups fed diets containing WS-AX, either alone or in combination with AXOS or with AXOS and WU-AX. The branched SCFA levels were increased in the rats fed diet containing WU-AX, yet these higher levels were reduced in rats fed the combination of WU-AX and AXOS, especially in the colon.

Example 2

Effect on Intestinal Parameters of WU-AX, WS-AX and AXOS Preparations and Combinations Thereof at Equal Total Doses Materials and Methods
Preparation of AXOS.

AXOS was prepared by FUGEIA NV (Leuven, Belgium) from wheat bran by endoxylanase treatment essentially as described by Swennen et al. (2006). After clarification using a disc centrifuge and after heat inactivation of the enzyme, the supernatant was filtered and purified by passage over anion exchange and cation exchange resins. Finally, the solution was concentrated and spray-dried. The clarification and ion exchange resin purification steps are not essential for the properties of AXOS described in the present invention. The composition and characterisation of the AXOS preparation is shown in Table 5.

Preparation of WU-AX.

WU-AX was prepared from commercial wheat bran by treating wheat bran suspended in demineralised water (1:10, w:v) with a commercial amylase (Termamyl 120 L, Novozymes, Bagsvaerd, Denmark; 1 ml per kg wheat bran) at 90° C. for 90 minutes. After boiling (20 min) and centrifugation, the destarched residue (DR) was washed with water and resuspended in demineralised water (1:12, w:v). The pH of the mash was adapted to pH 5.0 by addition of HCl and the mash treated with a commercial protease (Neutrase 0.8 L Novozymes, Bagsvaerd, Denmark; 80 ml per kg DR) at 55° C. under constant stirring for 4 h. The mash was heated to 100° C. and kept at this temperature for 30 minutes. After cooling to 60° C., the mash was filtered, the residue washed extensively with demineralised water, and finally dried in a lyophilisator. The composition and characterisation of the WU-AX preparation is shown in Table 5.

Preparation of WS-AX.

Commercial wheat endosperm flour was suspended in water (1:5, w:v) and treated with Termamyl 120 L (Novozymes, 60 ml per kg wheat flour) at 90° C. for 60 min. After boiling (20 min) and centrifugation of the suspension, the destarched residue (DR) was washed with water and resuspended in deionized water (1:5 w:v). The suspension was incubated at 50° C. and constant pH of 5.0 under continuous stirring with Neutrase 0.8 L (Novozymes) at 20 ml per kg DR for 20 h. The enzyme was inactivated by boiling for 30 min. After cooling to 25° C., the mash was centrifuged and the supernatant was discarded. The destarched and deproteinized reside was washed with water and resuspended in deionized water. The pH of the suspension was brought to 12 by addition of NaOH (8 M). The suspension was subsequently stirred for 18 h at room temperature. After adjustment of the pH to 7.0 by addition of HCl (10 M) followed by centrifugation, the alkali solubilised arabinoxylans (AS-AX) were recovered in the supernatant. AS-AX in the supernatant was precipitated by addition of ethanol (3:1, v:v), and the precipitated AS-AX was collected by filtration under vacuum over a filter paper. The residue was washed subsequently with acetone and diethyl ether. The residual ether was evaporated under a heated air stream of 50° C. The composition and characterisation of the WS-AX preparation is shown in Table 5.

Animal Trial Conditions.

6-week-old male rats (Wistar) were purchased from Elevage Janvier (Le Genest-St-Isle, France). The rats were housed in plastic cages with bottoms covered with sawdust (2 rats per cage) in an environmentally controlled room (22° C.) with a 14-10 h light-dark cycle. After 6 days of adaptation on control diet (Table 6), the rats were randomly assigned to one of 7 different treatment groups (10 rats/group), and the groups were each given free access during 14 days to pellets (10 mm) of one of the 7 diets described in Table 6. Rats were given free access to water and to pellets of the appropriate diet.

Animals were weighed and feed intake was measured 2 times per week. After 21 days of treatment, all animals were weighed and euthanized by carbon dioxide asphyxiation. Thereafter, the animals were dissected to collect the caecum content.

Analysis.

For determination of SCFA, the following was added to vials containing 300 mg of intestinal samples: 200 µL 9.38 mol/L sulfuric acid, 100 µL of 0.75% (v:v) 2-methylhexanoic acid (internal standard), 0.1 g NaCl, and 800 µL diethyl ether. After shaking the vials for 2 minutes, they were centrifuged (2500×g for 5 minutes) and 1.0 µl of the diethyl ether phases containing the organic acids was transferred to a glass vial and analyzed by gas chromatography as described by Van de Wiele et al. (2007).

All other analyses were performed as in Example 1.

Results

Rats were used as an in vivo model to study the effect of dietary inclusion of different types of arabinoxylans in mammalians. To this end, preparations of low molecular weight arabinoxylan-oligosaccharides (AXOS), high molecular weight water-soluble arabinoxylan (WS-AX) and high molecular weight water-unextractable arabinoxylan (WU-AX) were made and characterised (Table 5). The different preparations were added either alone or in combinations to different diets such that the sum of the AXOS and/or AX concentration represented an equal total dose of 5% in each of the diets, except for the control diet (Table 6). Gut health related parameters were assessed after a 14 days feeding period.

As increased intestinal SCFA levels are a hallmark of shifts in the intestinal microflora induced by intake of prebiotic compounds (Macfarlane et al 2006), the concentration of the main SCFA, acetate, propionate and butyrate, were measured in the caecum for the different treatment groups. Increased production of acetate was observed in the diets with added AXOS alone, WS-AX alone, AXOS combined with WS-AX and the triple combination of AXOS, WS-AX and WU-AX (FIG. 3A). The amount of propionate produced per caecum was not strongly affected, yet a moderate increase was observed for the diet with AXOS in combination with WS-AX (FIG. 3B). As in example 1, the most marked changes were observed for the amount of butyrate produced per caecum (FIG. 3C). AXOS and WS-AX by themselves did not affect caecal butyrate production when compared to the control, whereas the combination of AXOS and WS-AX caused a significant synergistic increase of caecal butyrate production. WU-AX by itself caused an increase in caecal butyrate production, yet WU-AX in combination with AXOS and the triple combination of AXOS, WS-AX and WU-AX resulted in a strong synergistic increase of butyrate production.

The branched SCFA isobutyrate and isovalerate are formed during the catabolism of branched chain amino acids valine, leucine, isoleucine (Mortensen et al. 1992; Macfarlane and Macfarlane, 1995), and are an indicator of protein fermentation in the gut. The caecal contents of the rats were therefore assessed for the branched SCFA isobutyrate and isovalerate. Reductions in caecal branched SCFA levels were observed in groups fed diets containing either AXOS alone, WS-AX alone, the combination of AXOS and WS-AX, and the triple combination of AXOS, WS-AX and WU-AX (FIG. 4).

The most desired effects on gut health related parameters were observed either with the diets containing a combination of WS-AX and AXOS, a combination of WU-AX and AXOS, or a combination of WS-AX, AXOS and WU-AX. With these combinations, in particular with the combination of WU-AX and AXOS and the combination of WS-AX, AXOS and WU-AX, a strong synergistic increase in production of butyrate, the most beneficial SCFA from a gut health perspective, was observed in the large intestine. With the diets containing a combination of AXOS and WS-AX, and the diets containing a combination of WS-AX, AXOS and WU-AX, the increase in butyrate levels was accompanied with a reduction of the level of branched SCFA, a marker of undesired intestinal protein fermentation.

Example 3

Production of Processed Food Products Containing a Combination of M-AX and AXOS

A ready-to-eat cereal product is made by mixing the following ingredients in an industrial mixer:

| | |
|---|---|
| Wheat endosperm flour | 23% |
| Corn meal | 30% |
| Wheat bran | 25% |
| AXOS preparation | 7% |
| Sucrose | 13% |
| Salt (NaCl) | 1% |
| Vegetable oil | 1% |

In the above formulation, the AXOS preparation is the same as the one used in Example 2. The mix is extruded through a standard twin screw extruder (Brabender), with a die of 1.2 mm and a rotary cutter to chop the extruded product. During the extrusion, water is metered in via a flow meter until the desired consistency is reached. At such point as an acceptable dough product was produced, water flow is maintained at that acceptable, minimal level. The resulting extruded product is then dried.

A yoghurt food product is made by mixing the following ingredients:

| | |
|---|---|
| low-fat yoghurt | 84.2% |
| Wheat bran | 8.4% |
| AXOS preparation | 3.2% |
| sucrose | 4.2% |

In the above formulation, the AXOS preparation is the same as the one used in Example 2. After mixing the ingredients the yoghurt is packaged in individual portions of 125 g.

Example 4

Production of Food Products Containing a Combination of WU-AX, WS-AX and AXOS

A ready-to-eat cereal food product is made by mixing the following ingredients in an industrial mixer:

| | |
|---|---|
| Wheat endosperm flour | 22% |
| Rye wholegrain flour | 31% |
| Wheat bran | 25% |
| AXOS preparation | 7% |
| Sucrose | 13% |
| Salt (NaCl) | 1% |
| Vegetable oil | 1% |

In the above formulation, the AXOS preparation is the same as the one used in Example 2. Per kg of the above mix, 200 ml of a suspension of water containing 12 g of an endoxylanase preparation (Grindamyl H640, Danisco, Copenhagen, Denmark) is added, mixed, and allowed to rest at room temperature for 40 minutes.

The mix is extruded through a standard twin screw extruder (Brabender), with a die of 1.2 mm and a rotary cutter to chop the extruded product. The resulting extruded product then dried.

Tables

TABLE 1

Composition and characterisation of the preparations of AXOS, WS-AX and WU-AX used in Example 1. Composition parameters are expressed as % (w/w) on dry weight basis. A/X ratio: arabinose to xylose ratio or the average degree of arabinose substitution of arabinoxylan; avDP: average degree of polymerisation of arabinoxylan.

| | AXOS preparation | WS-AX preparation | WU-AX preparation |
|---|---|---|---|
| ARABINOXYLAN | | | |
| bound xylose | 68.2 | 45.8 | 28.2 |
| bound arabinose | 14.6 | 21.5 | 15.5 |
| total arabinoxylan | 85.2 | 67.3 | 43.7 |
| A/X ratio | 0.21 | 0.47 | 0.55 |
| avDP | 5 | 146 | >200 |
| OTHER CARBOHYDRATES | | | |
| non-cellulosic bound glucose | 12.5 | 16.8 | 1.2 |
| bound galactose | 0.6 | 0.9 | 0.2 |
| bound mannose | 0.2 | 0.7 | 1.5 |
| MONOSACCHARIDES | | | |
| xylose | 1.2 | 0.2 | <0.1 |
| arabinose | 0.2 | 0.5 | <0.1 |
| glucose | 0.2 | 5.2 | <0.1 |
| OTHER COMPONENTS | | | |
| protein | 0.4 | 3.5 | 10.4 |
| ash | 0.5 | 0.2 | 4.4 |

TABLE 2

Composition of the different rat diets (in g per 100 g) used in Example 1.

| | control | WU-AX | WU-AX + AXOS | WS-AX | WS-AX + AXOS | WU-AX + WS-AX + AXOS |
|---|---|---|---|---|---|---|
| Corn starch (pre-gelatinised) | 73.50 | 66.30 | 63.28 | 68.16 | 65.94 | 58.74 |
| AXOS preparation | — | — | 2.22 (1.80) | — | 2.22 (1.80) | 2.22 (1.80) |
| WU-AX preparation | — | 9.14 (3.60) | 9.14 (3.60) | — | — | 9.14 (3.60) |
| WS-AX preparation | — | — | — | 5.34 (3.60) | 5.34 (3.60) | 5.34 (3.60) |
| Soy protein isolate | 10.80 | 9.30 | 9.30 | 10.80 | 10.80 | 9.30 |
| Wheat gluten | 5.00 | 5.00 | 5.00 | 5.00 | 5.00 | 5.00 |
| Soybean oil | 3.50 | 3.20 | 3.20 | 3.50 | 3.50 | 3.20 |
| L-Lysine | 0.45 | 0.50 | 0.50 | 0.45 | 0.45 | 0.50 |
| DL-Methionine | 0.15 | 0.15 | 0.15 | 0.15 | 0.15 | 0.15 |
| L-Cystine | 0.08 | 0.07 | 0.07 | 0.08 | 0.08 | 0.07 |
| L-Threonine | 0.13 | 0.15 | 0.15 | 0.13 | 0.13 | 0.15 |
| L-Tryptophan | 0.07 | 0.07 | 0.07 | 0.07 | 0.07 | 0.07 |
| Vitamin premix | 1.00 | 1.00 | 1.00 | 1.00 | 1.00 | 1.00 |
| Mineral/trace elem. premix | 4.20 | 4.20 | 4.20 | 4.20 | 4.20 | 4.20 |
| Calcium carbonate | 0.70 | 0.50 | 0.50 | 0.70 | 0.70 | 0.50 |
| $Cr_2O_3$ | 0.20 | 0.20 | 0.20 | 0.20 | 0.20 | 0.20 |
| Choline chloride | 0.20 | 0.20 | 0.20 | 0.20 | 0.20 | 0.20 |
| Butylhydroxytoluol | 0.02 | 0.02 | 0.02 | 0.02 | 0.02 | 0.02 |

The concentrations of AXOS, WU-AX and WS-AX preparations indicated between brackets were corrected for their purity as calculated by their total AX/AXOS content.

TABLE 3

Effect of AXOS, WS-AX and WU-AX and their additive combinations on the concentrations of acetate, propionate, butyrate and on the summed concentrations of isovalerate and isobutyrate (branched SCFA) in the caecum of rats after 14 days of feeding. Concentrations are expressed either in mmol per kg on fresh weight (FW) basis of caecum content, in mmol per kg on dry weight (DW) basis of caecum content, or in µmol per caecum. Different letters behind data within the same column indicate statistically significant difference at $p < 0.05$.

| Caecum | | | | |
|---|---|---|---|---|
| | Acetate (mmol per kg FW) | Propionate (mmol per kg FW) | Butyrate (mmol per kg FW) | Branched SCFA (mmol per kg FW) |
| Control | 104.7 (b) | 24.1 (a) | 33.5 (c) | 3.1 (ab) |
| WU-AX | 112.2 (ab) | 23.5 (a) | 78.6 (ab) | 3.8 (a) |
| WU-AX + AXOS | 123.8 (ab) | 23.4 (a) | 108.8 (a) | 2.9 (ab) |
| WS-AX | 174.7 (a) | 30.1 (a) | 34.8 (c) | 0.2 (c) |
| WS-AX + AXOS | 133.3 (ab) | 20.4 (a) | 57 (bc) | 0.4 (c) |
| WU-AX + WS-AX + AXOS | 144.1 (ab) | 27.6 (a) | 102.7 (ab) | 1.5 (bc) |
| | Acetate (mmol per kg DW) | Propionate (mmol per kg DW) | Butyrate (mmol per kg DW) | Branched SCFA (mmol per kg DW) |
| Control | 556.8 (b) | 129 (a) | 184.5 (c) | 17.0 (bc) |
| WU-AX | 524.6 (b) | 110.4 (a) | 347.2 (b) | 17.9 (ab) |
| WU-AX + AXOS | 574.5 (b) | 110 (a) | 507.1 (a) | 13.6 (ab) |
| WS-AX | 987.5 (a) | 175.4 (a) | 204.8 (bc) | 1.1 (d) |
| WS-AX + AXOS | 717.8 (ab) | 112.8 (a) | 293.4 (ab) | 0.5 (cd) |
| WU-AX + WS-AX + AXOS | 731.2 (ab) | 140.9 (a) | 483.9 (a) | 6.4 (ab) |
| | Acetate (µmol per caecum) | Propionate (µmol per caecum) | Butyrate (µmol per caecum) | Branched SCFA (µmol per caecum) |
| Control | 194.4 (b) | 45.2 (b) | 63.4 (e) | 5.9 (a) |
| WU-AX | 255.9 (ab) | 55.3 (ab) | 181 (cd) | 8.7 (a) |
| WU-AX + AXOS | 381.4 (a) | 77.3 (ab) | 366.5 (a) | 8.7 (a) |
| WS-AX | 754.5 (a) | 110.9 (a) | 140.1 (d) | 0.7 (b) |
| WS-AX + AXOS | 618 (ab) | 68.1 (ab) | 196 (c) | 0.4 (b) |
| WU-AX + WS-AX + AXOS | 699.1 (a) | 141.2 (a) | 459 (a) | 6 (ab) |

TABLE 4

Effect of AXOS, WS-AX and WU-AX and their additive combinations on the concentrations of acetate, propionate, butyrate and on the summed concentrations of isovalerate and isobutyrate (branched SCFA) in the colon of rats after 14 days of feeding. Concentrations are expressed either in mmol per kg on fresh weight (FW) basis of colon content, in mmol per kg on dry weight (DW) basis of colon content, or in µmol per colon. Different letters behind data within the same column indicate statistically significant difference at $p < 0.05$.

| | Acetate (mmol per kg FW) | Propionate (mmol per kg FW) | Butyrate (mmol per kg DW) | Branched SCFA (mmol per kg DW) |
|---|---|---|---|---|
| Control | 68.4 (a) | 12.5 (c) | 13.9 (d) | 2.5 (a) |
| WU-AX | 94.7 (a) | 17.9 (abc) | 46.1 (ab) | 2.4 (a) |
| WU-AX + AXOS | 104.6 (a) | 15.5 (abc) | 36.7 (bc) | 1.9 (a) |
| WS-AX | 93.3 (a) | 26 (a) | 22.1 (cd) | 0.6 (cd) |
| WS-AX + AXOS | 106.3 (a) | 14.1 (bc) | 37.3 (b) | 0.2 (d) |
| WU-AX + WS-AX + AXOS | 101.6 (a) | 19.8 (abc) | 58.2 (ab) | 1.5 (bc) |
| | Acetate (mmol per kg DW) | Propionate (mmol per kg DW) | Butyrate (mmol per kg DW) | Branched SCFA (mmol per kg DW) |
| Control | 213.7 (b) | 39.1 (b) | 47.6 (c) | 9.4 (a) |
| WU-AX | 285.7 (ab) | 53.9 (ab) | 141.9 (ab) | 7.8 (ab) |
| WU-AX + AXOS | 312.6 (ab) | 46.5 (b) | 102.4 (b) | 5.1 (bc) |
| WS-AX | 341 (ab) | 95.1 (a) | 69.8 (c) | 2.2 (de) |
| WS-AX + AXOS | 409.3 (a) | 54.2 (ab) | 136.9 (ab) | 0.7 (e) |
| WU-AX + WS-AX + AXOS | 368.4 (a) | 71.7 (a) | 193.2 (a) | 3.5 (cd) |

TABLE 4-continued

Effect of AXOS, WS-AX and WU-AX and their additive combinations on the concentrations of acetate, propionate, butyrate and on the summed concentrations of isovalerate and isobutyrate (branched SCFA) in the colon of rats after 14 days of feeding. Concentrations are expressed either in mmol per kg on fresh weight (FW) basis of colon content, in mmol per kg on dry weight (DW) basis of colon content, or in μmol per colon. Different letters behind data within the same column indicate statistically significant difference at $p < 0.05$.

|  | Acetate (μmol per colon) | Propionate (μmol per colon) | Butyrate (μmol per colon) | Branched SCFA (μmol per colon) |
|---|---|---|---|---|
| Control | 86.6 (b) | 14.3 (b) | 15 (d) | 2.7 (b) |
| WU-AX | 211.8 (ab) | 48.1 (a) | 116.4 (a) | 5.9 (a) |
| WU-AX + AXOS | 270.9 (a) | 40.5 (ab) | 86 (ab) | 4.3 (ab) |
| WS-AX | 141.3 (a) | 37.8 (ab) | 32.1 (c) | 1.2 (c) |
| WS-AX + AXOS | 209.5 (ab) | 25 (ab) | 77.4 (b) | 0.4 (c) |
| WU-AX + WS-AX + AXOS | 256.2 (a) | 52.3 (a) | 141 (a) | 2.8 (bc) |

TABLE 5

Composition and characterisation of the preparations of AXOS, WS-AX and WU-AX used in Example 2. Composition parameters are expressed as % (w/w) on dry weight basis. AX ratio: arabinose to xylose ratio or the average degree of arabinose substitution of arabinoxylan; avDP: average degree of polymerisation of arabinoxylan.

|  | AXOS preparation | WS-AX preparation | WU-AX preparation |
|---|---|---|---|
| ARABINOXYLAN |  |  |  |
| bound xylose | 68.8 | 63.6 | 29.7 |
| bound arabinose | 14.6 | 29.4 | 17.8 |
| total arabinoxylan | 83.4 | 81.3 | 41.3 |
| A/X ratio | 0.21 | 0.45 | 0.57 |
| avDP | 5 | >200 | >200 |
| OTHER CARBOHYDRATES |  |  |  |
| non-cellulosic bound glucose | 12.4 | 14.5 | 0.9 |
| bound galactose | 0.6 | 0.7 | 0.2 |
| bound mannose | 0.2 | 0.8 | 1.5 |
| MONOSACCHARIDES |  |  |  |
| xylose | 1.2 | <0.1 | <0.1 |
| arabinose | 0.2 | <0.1 | <0.1 |
| glucose | 0.2 | <0.1 | <0.1 |
| OTHER COMPONENTS |  |  |  |
| protein | 0.4 | 1.8 | 10.4 |
| ash | 0.5 | 0.4 | 5.7 |

TABLE 6

Composition of the different rat diets (in g per 100 g) used in Example 2.

|  | Control | AXOS | WU-AX | AXOS + WU-AX | WS-AX | AXOS + WS-AX | AXOS + WU-AX + WS-AX |
|---|---|---|---|---|---|---|---|
| AXOS preparation | 0.00 | 6.12 (5.00) | 0.00 | 3.06 (2.50) | 0.00 | 3.06 (2.50) | 2.06 (1.67) |
| WU-AX preparation | 0.00 | 0.00 | 12.58 (5.00) | 6.29 (2.50) | 0.00 | 0.00 | 4.17 (1.67) |
| WS-AX preparation | 0.00 | 0.00 | 0.00 | 0.00 | 7.14 (5.00) | 3.57 (2.50) | 2.38 (1.67) |
| Corn starch pre-gelatinised | 74.54 | 68.42 | 62.88 | 65.65 | 67.40 | 67.88 | 66.22 |
| Soy protein isolate | 14.00 | 14.00 | 14.00 | 14.00 | 14.00 | 14.00 | 14.00 |
| Wheat gluten | 0.92 | 0.92 | 0.00 | 0.46 | 0.92 | 0.92 | 0.61 |
| L-Lysine HCl | 0.36 | 0.36 | 0.36 | 0.36 | 0.36 | 0.36 | 0.36 |
| DL-Methionine | 0.15 | 0.15 | 0.15 | 0.15 | 0.15 | 0.15 | 0.15 |
| L-Cystine | 0.12 | 0.12 | 0.12 | 0.12 | 0.12 | 0.12 | 0.12 |
| L-Threonine | 0.20 | 0.20 | 0.20 | 0.20 | 0.20 | 0.20 | 0.20 |
| L-Tryptophan | 0.07 | 0.07 | 0.07 | 0.07 | 0.07 | 0.07 | 0.07 |

TABLE 6-continued

Composition of the different rat diets (in g per 100 g) used in Example 2.

|  | Control | AXOS | WU-AX | AXOS + WU-AX | WS-AX | AXOS + WS-AX | AXOS + WU-AX + WS-AX |
|---|---|---|---|---|---|---|---|
| Vitamin premix | 1.00 | 1.00 | 1.00 | 1.00 | 1.00 | 1.00 | 1.00 |
| Mineral/trace elem. Premix | 4.20 | 4.20 | 4.20 | 4.20 | 4.20 | 4.20 | 4.20 |
| Di-calcium phosphate | 0.70 | 0.70 | 0.70 | 0.70 | 0.70 | 0.70 | 0.70 |
| Choline chloride | 0.20 | 0.20 | 0.20 | 0.20 | 0.20 | 0.20 | 0.20 |
| Butylhydroxytoluol | 0.02 | 0.02 | 0.02 | 0.02 | 0.02 | 0.02 | 0.02 |
| Soybean oil | 3.50 | 3.50 | 3.50 | 3.50 | 3.50 | 3.50 | 3.50 |
| Cr2O3 | 0.02 | 0.02 | 0.02 | 0.02 | 0.02 | 0.02 | 0.02 |

The concentrations of AXOS, WU-AX and WS-AX preparations indicated between brackets were corrected for their purity as calculated by their total AX/AXOS content.

References

Andersson, R. and Aman, P. (2001) Cereal arabinoxylan: occurrence, structure and properties. In Advanced dietary fibre technology, pp. 301-314 [B V McCleary and L Prosky, editors]. Oxford: Blackwell Science Ltd.

Barron, C., Surget, A. and Rouau, X. (2007) Relative amounts of tissues in mature wheat (Triticum aestivum L.) grain and their carbohydrate and phenolic acid composition. J. Cereal Sci. 45: 88-96.

Campbell J. M., Fahey, G. C., Wolf, B. W. (1997) Selected indigestible oligosaccharides affect large bowel mass, cecal and fecal short-chain fatty acids, pH and micorflora in rats. J. Nutr. 127:130-136

Courtin C M, Broekaert W F, Swennen K, Lescroart O, Onagbesan O, Buyse J, Decuypere E, Van de Wiele T, Marzorati M, et al. Dietary inclusion of wheat bran arabinoxylooligosaccharides induces beneficial nutritional effects in chickens. Cereal Chem. 2008; 85:607-13.

Courtin, C. M. and Delcour, J. A. (2002). Arabinoxylans and endoxylanases in wheat flour bread-making. J. Cereal Sci. 35, 225-243.

Courtin, C. M., Van den Broeck, H. and Delcour, J. A. (2000). Determination of reducing end sugar residues in oligo- and polysaccharides by gas liquid chromatography. Journal of Chromatography A, 866, 97-104.

De Preter V, Geboes K, Verbrugghe K, De Vuyst L, Vanhoutte T, Huys G, Swings J, Pot B, Verbeke K (2004) The in vivo use of the stable isotope-labelled biomarkers lactose-[15N] ureide and [2H4]tyrosine to assess the effects of pro- and prebiotics on the intestinal flora of healthy human volunteers. Brit J Nutrition 92: 439-446.

Geboes K. P., De Peter V, Luypaerts A., Bammens B., Evenepoel P., Ghoos Y., Rutgeerts P., Verbeke K. (2005) Validation of lactose-[15N]ureide as a tool to study colonic nitrogen metabolism. Am J Physiol 288: G994-G999.

Gibson , G. R. and Roberfroid M. B. (1995) Dietary modulation of the human colonic microbiota: introducing the concept of prebiotics. J. Nutr. 125: 1401-1412.

Grasten S, Liukkonen K-H, Chrevatidis A, El-Nezami H, Poutanen K, Mykkanen H (2003) Effects of wheat pentosan and inulin on the metabolic activity of fecal microbiota and on bowel function in healthy humans. Nutrition Research 23: 1503-1514.

Hsu C-K, Liao, J-W, Chung, Y-C, Hsieh, C-P, Chan, Y-C (2004) Xylooligosaccharides and fructooligosaccharides affect the intestinal microbiota and precancerous colonic lesions development in rats. J. Nutr. 134:1523-1528

Huang D, Ou B, Hampsch-Woodill M, Flanagan J A, Prior R L. (2002) High-throughput assay of oxygen radical absorbance capacity (ORAC) using a multichannel liquid handling system coupled with a microplate fluorescence reader in 96-well format. J Agric Food Chem. 50:4437-4444.

Izydorczyk M S, Biliaderis C G. (1995) Cereal arabinoxylans: Advances in structure and physicochemical properties. Carbohydr Polym. 28:33-48.

Johnson K. A. (1977) The production of secondary amines by human gut bacteria and its possible relevance to carcinogenesis. Med. Lab. Sci. 34:131-143

Kabel, M. A., Kortenoeven, L., Sohols, H. A. & Voragen, A. G. J. (2002). In vitro fermentability of differently substituted xylo-oligosaccharides. Journal of Agricultural and Food Chemistry, 50: 6205-6210.

Lane, D. J. (1991) 165/23S rRNA sequencing. In: Stackebrandt, E., Goodfellow, M. (Eds.), Nucleic Acid Techniques in Bacterial Systematics. John Wiley & Sons Ltd., West Sussex, United Kingdom, pp. 115-175.

Macfarlane S and Macfarlane G T (1995) Proteolysis and amino acid fermentation. In: Human Colonic Bacteria: Role in Nutrition, Physiology and Pathology. Gibson OR Macfarlane GT (eds.) CRC Press, Boca Raton, Fla. pp. 75-100.

Macfarlane S, Macfarlane G T, Cummings J H. (2006) Prebiotics in the gastrointestinal tract. Aliment. Pharmacol. Ther. 24:701-14

McIntosh G H, Royle P J, Pointing G. (2001) Wheat aleurone flour increases cecal beta-glucuronidase activity and butyrate concentration and reduces colon adenoma burden in azoxymethane-treated rats. J. Nutr. 131:127-131.

Mortensen P B, Clausen M R, Bonnen H, Hove H, Holtug K. (1992) Colonic fermentation of ispaghula, wheat bran, glucose, and albumin to short-chain fatty acids and ammonia evaluated in vitro in 50 subjects. J Parenter Enteral Nutr, 16:433-439.

Moura P, Berate R, Carvalheiro F, Gino F, Loureiro-Dias M C & Esteves M P (2007) In vitro fermentation of xylo-oligosaccharides from corn cobs autohydrolysis by Bifidobacterium and Lactobacillus strains. Lwt-Food Science and Technology 40: 963-972.

Muyzer, G., Dewaal, E. C., Uitterlinden, A. G. (1993) Profiling of complex microbial populations by denaturing gradient gel electrophoresis-analysis of polymerase chain reaction-amplified genes coding for 16S rRNA. Appl. Environ. Microbiol. 59, 695-700.

Okazaki M., Fujikawa, S., Matsumoto, N. (1990) Effect of xylooligosaccharides on the growth of bifidobacteria. Bifidobacteria Microflora 9:77-86

Ou, B., Hampsch-Woodill, M., Prior, R. L. (2001) Development and validation of an improved oxygen radical absorbance capacity assay using fluorescein as the fluorescent probe. J Agric Food Chem. 49: 4619-4626

Perrin P, Pierre F, Petry Y, Champ M, Berreur M, Pradal G, Barnet F, Meflah K, Menanteau J (2001) Only fibres promoting a stable butyrate producing colonic ecosystem decrease the rate of aberrant crypt foci in rats. Gut 48:53-61

Ramakrishna B. S., Roberts-Thomas I. C., Pannall P. R., Roediger W. E. W. (1991) Impaired sulphation of phenol by the colonic mucosa in quiescent and active colitis. Gut 32:46-49

Rinttilä T, Kassinen A, Malinen E, Krogius L, PaIva A. (2004) Development of an extensive set of 16S rDNA-targeted primers for quantification of pathogenic and indigenous bacteria in faecal samples by real-time PCR. J. Appl. Microbiol. 97:1166-1177

Roberfroid, M. B. (1998) Prebiotics and synbiotics: concepts and nutritional properties. Brit. J. Nutr. 80:S197-S202.

Roediger W E (1982) Utilization of nutrients by isolated epithelial cells of the rat colon. Gastroenterology 83: 424-429.

Satokari, R M., Vaughan, E. E., Akkermans, A. D. L., Saarela, M. and De Vos, W. M. (2001) Bifidobacterial diversity in human feces detected by genus-specific PCR and denaturing gradient gel electrophoresis. Appl. Env. Micorbiol. 67:504-513.

Scheppach W, Barthram H P, Richter F (1995) Role of short-chain fatty acids in the prevention of colorectal cancer. Eur J Cancer 31A:1077-1080.

Swennen K, Courtin C M, Lindemans G C J E, (2006). Delcour J A. Large-scale production and characterisation of wheat bran arabinoxylooligosaccharides. J Sci Food Agric. 30; 86:1722-31.

Teitelbaum, J. E., Walker, W. A. (2002) Nutritional impact of pre- and probiotics as protective gastrointestinal organisms. Annual Review of Nutrition 22: 107-38

Topping D L and Clifton P M (2001) Short-chain fatty acids and human colonic function: roles of resistant starch and nonstarch polysaccharides. Physiol Rev 81:1031-1064

Toyoda, Y., Hatakana, Y., Suwa, Y., (1993) Effect of xylooligosaccharides on calcium absorption. In Proc. of 47th Annual Meeting of Jon Sac Nutr Food Sci, Tokyo, p109

Van de Wiele T, Boon N, Possemiers S, Jacobs H, Verstraete W. (2007) Inulin-type fructans of longer degree of polymerization exert more pronounced in vitro prebiotic effects. J Appl Microbial. 102:452-60.

Van Loo, J. A. E. (2004) Prebiotics promote good health. The basis, the potential, and the emerging evidence. J Clin Gastroenterol 38: 570-575.

van Nuenen M. H. M. C., Meyer P. D., Venema K (2003) The effect of various inulins and Clostridium difficile on the metabolic activity of the human colonic microbiota in vitro. Microbial Ecol. Health Dis. 15: 137. 14

Visek W J. (1978) Diet and cell growth modulation by ammonia. Am J Clin Nutr 31, Supp 10: S216-S220.

Wong, J. M., de Souza, R., Kendall, C. W., Emam, A., Jenkins, D. J. (2006) Colonic health: fermentation and short chain fatty acids. J Clin Gastroenterol 40:235-243.

Yamada H., Itoh, K., Morishita, Y., Taniguchi, H. (1993) Structure and properties of oligosaccharides from wheat bran. Cereal Foods World 38: 490-492

The invention claimed is:

1. A processed food product comprising on a dry weight basis between 2.5% (w/w) and 15% (w/w) of water-unextractable arabinoxylans (WU-AX) having an average degree of arabinose substitution between 0.1 and 1.3 and an average degree of polymerization exceeding 200 and on a dry weight basis between 2.5% (w/w) and 15% (w/w) of arabinoxylan-oligosaccharides (AXOS) having an average degree of arabinose substitution between 0.15 and 1 and an average degree of polymerization between 3 and 50.

2. The processed food product according to claim 1 comprising between 1 and 15 g of WU-AX and between 1 and 5 g AXOS per serving size of said processed food product.

3. The processed food product according to claim 1 comprising between 1% (w/w) and 15% (w/w) of water-soluble arabinoxylans (WS-AX) having an average degree of arabinose substitution between 0.1 and 1.0 and a degree of polymerization exceeding 50 and up to 15000.

4. The processed food product according to claim 3 wherein said processed food product is a food product comprising between 0.3 and 5 g of WS-AX per serving size of said processed food product.

5. The processed food product according to claim 1 wherein said processed food product is a baked good.

6. The processed food product according to claim 1 wherein said processed food product is a ready-to-eat cereal.

7. The processed food product according to claim 1 wherein said processed food product is a pasta product.

8. The processed food product according to claim 1 wherein said processed food product is a dairy product.

9. The processed food product according to claim 1 wherein said processed food product is a fruit based drink.

10. A food supplement comprising on a dry weight basis between 10% (w/w) and 35% (w/w) of WU-AX having an average degree of arabinose substitution between 0.1 and 1.3 and an average degree of polymerization exceeding 200 and between 10% (w/w) and 70% (w/w) of AX OS having an average degree of arabinose substitution between 0.15 and 1 and an average degree of polymerization between 3 and 50.

11. The food supplement according to claim 10 further comprising on a dry weight basis between 5% (w/w) and 70% (w/w) of WS-AX having an average degree of arabinose substitution between 0.1 and 1.0 and a degree of polymerization exceeding 50 and up to 15000.

12. A method for using a preparation comprising:
at least 30% of AXOS with a degree of polymerization between 3 and 50 for production of:
a processed food product, said processed food product comprising on a dry weight basis between 2.5% (w/w) and 15% (w/w) of water-unextractable arabinoxylans (WU-AX) and on a dry weight basis between 2.5% (w/w) and 15% (w/w) of arabinoxylan-oligosaccharides (AXOS),
wherein the WU-AX of the processed food product corresponds to a sum of all bound arabinose and xylose retained in residue obtained after extracting said processed food product with hot water at a temperature between 95° C. and 100° C. during at least 30 minutes in a presence of a thermostable amylase followed by cooling the processed food product to 70° C. and wherein a range of AXOS is determined as a sum of all bound xylose and arabinose in a soluble phase obtained after extracting said processed food product with hot water at a temperature between 95° C. and 100° C. during at least 30 minutes with a thermostable amylase and to which, after cooling to 70° C., ethanol has been added to a final concentration of 70/30 (v/v) ethanol/water.

13. A method for using a preparation comprising:
at least 15% WU-AX for production of:
a processed food product, said processed food product comprising on a dry weight basis between 2.5% (w/w) and 15% (w/w) of water-unextractable arabinoxylans (WU-AX) and on a dry weight basis between 2.5% (w/w) and 15% (w/w) of arabinoxylan-oligosaccharides (AXOS), wherein the WU-AX of the processed food product corresponds to a sum of all bound arabinose and xylose retained in residue obtained after extracting said processed food product with hot water at a temperature between 95° C. and 100° C. during at least 30 minutes in a presence of a thermostable amylase followed by cooling the processed food product to 70° C. and wherein a range of AXOS is determined as a sum of all bound xylose and arabinose in a soluble phase obtained after extracting said processed food product with hot water at a temperature between 95° C. and 100° C. during at least 30 minutes with a thermostable amylase and to which, after cooling to 70° C., ethanol has been added to a final concentration of 70/30 (v/v) ethanol/water.

14. The method according to claim 13 wherein said preparation is a cereal bran.

15. A method for stimulating butyrate production in a large intestine comprising administration of:

a processed food product, said processed food product comprising on a dry weight basis between 2.5% (w/w) and 15% (w/w) of water-unextractable arabinoxylans (WU-AX) and on a dry weight basis between 2.5% (w/w) and 15% (w/w) of arabinoxylan-oligosaccharides (AXOS), wherein the WU-AX of the processed food product corresponds to a sum of all bound arabinose and xylose retained in residue obtained after extracting said processed food product with hot water at a temperature between 95° C. and 100° C. during at least 30 minutes in a presence of a thermostable amylase followed by cooling the processed food product to 70° C. and wherein a range of AXOS is determined as a sum of all bound xylose and arabinose in a soluble phase obtained after extracting said processed food product with hot water at a temperature between 95° C. and 100° C. during at least 30 minutes with a thermostable amylase and to which, after cooling to 70° C., ethanol has been added to a final concentration of 70/30 (v/v) ethanol/water.

* * * * *